United States Patent
Tagami et al.

(10) Patent No.: US 8,448,195 B2
(45) Date of Patent: May 21, 2013

(54) STACKING TYPE TRAY AND TRAY DEVELOPING MECHANISM AND STACKING TYPE TRAY DEVELOPING SYSTEM

(75) Inventors: Kenji Tagami, Tokyo (JP); Masashi Kubota, Tokyo (JP); Hisaya Niizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 12/744,192

(22) PCT Filed: Oct. 23, 2008

(86) PCT No.: PCT/JP2008/069226
§ 371 (c)(1),
(2), (4) Date: Jul. 7, 2010

(87) PCT Pub. No.: WO2009/066538
PCT Pub. Date: May 28, 2009

(65) Prior Publication Data
US 2010/0288661 A1     Nov. 18, 2010

(30) Foreign Application Priority Data
Nov. 21, 2007 (JP) .................................. 2007-302051

(51) Int. Cl.
*G11B 17/26* (2006.01)
(52) U.S. Cl.
USPC ................................................ 720/614
(58) Field of Classification Search
USPC ........................................................ 720/614
See application file for complete search history.

(56) References Cited

U.S. PATENT DOCUMENTS

| | | | |
|---|---|---|---|
| 2002/0064123 A1* | 5/2002 | Takamatsu et al. | 369/192 |
| 2007/0011692 A1* | 1/2007 | Seki et al. | 720/614 |
| 2008/0077947 A1* | 3/2008 | Seki et al. | 720/614 |
| 2010/0088712 A1* | 4/2010 | Tokita et al. | 720/614 |

FOREIGN PATENT DOCUMENTS

| | | |
|---|---|---|
| JP | 15-2038 | 2/1940 |
| JP | S42015886 B | 9/1967 |
| JP | S58027421 B | 6/1983 |
| JP | 63-249963 A | 10/1988 |
| JP | 63-249964 A | 10/1988 |

(Continued)

OTHER PUBLICATIONS

Office action in Japanese counterpart patent application, publication No. 2009-542512, dated May 29, 2009. (translation provided; note all JP refs cited therein uploaded as one file).

(Continued)

*Primary Examiner* — Mark Blouin

(57) ABSTRACT

To develop optical discs stored while being stacked and to load them to a plurality of recording/reproducing devices simultaneously. Trays for mounting optical discs are stacked to configure an optical disc transportation body, and the portions being exposed without overlapping when the stacked trays are viewed from the stacking direction are utilized as tray operation portions for handling. Supporting portions abutting against the tray operation portions inherent to respective trays in one to one correspondence are fixed with an interval in the vertical direction to the frames configuring a tray distributing/holding portion. The tray operation portion of each tray is held by the supporting portion at each position by moving the optical disc transportation body downward along the frames, and intervals corresponding to the arrangement pitch of recording/reproducing devices are formed between respective trays.

4 Claims, 34 Drawing Sheets

FOREIGN PATENT DOCUMENTS

| | | | |
|---|---|---|---|
| JP | 63249963 A | 10/1988 | |
| JP | 63249964 A | 10/1988 | |
| JP | 8-31072 A | 2/1996 | |
| JP | 10-3733 A | 1/1998 | |
| JP | 10003733 A | 1/1998 | |
| JP | 10-003733 | * | 6/1998 |
| JP | 10-283709 A | 10/1998 | |
| JP | 2003051149 A | 2/2003 | |
| JP | 2004071149 | 3/2004 | |
| JP | 2004-145994 A | 5/2004 | |
| JP | 2006-155845 A | 6/2006 | |
| JP | 2006155845 A | 6/2006 | |
| JP | 2006-216156 A | 8/2006 | |
| JP | 2006216156 A | 8/2006 | |
| JP | 2007012201 A | 1/2007 | |
| JP | 2007-172726 A | 7/2007 | |

OTHER PUBLICATIONS

International Search Report for PCT/JP2008/069226, mailed Dec. 2, 2008.

Japanese Office Action for JP2009-542512 mailed on Nov. 20, 2012.

Japanese Office Action for JP2009-542512 mailed on Mar. 19, 2013.

* cited by examiner

STACKING TYPE TRAY AND TRAY DEVELOPING MECHANISM AND STACKING TYPE TRAY DEVELOPING SYSTEM

TECHNICAL FIELD

The present invention relates to a stacking type tray for compactly housing disc-type storage media such as optical discs in a stacked manner, a tray developing mechanism for forming a gap suited for loading the media to a recording-reproducing device between the storage media on each tray by developing the stacked trays, and a stacking type tray developing system in which those are combined.

BACKGROUND ART

Recently, storage devices for storing information have notably come to be of mass capacitance, due to increases in amount of information handled in computers.

The main types of such storage devices are disc-type storage media such as hard discs and optical discs, and magnetic tapes.

Hard discs are superior to other two types in terms of the speed of recording and reproducing as well as the random accessibility, so that the hard discs are used as main storage devices. Disc-type storage media such as the optical discs as well as magnetic tapes are used for archives and backups.

Magnetic tapes are superior to disc-type recording media such as optical discs in terms of low price and recording capacity per portion volume, while the disc-type storage media such as the optical discs are superior to the magnetic tapes in terms of the random accessibility and saving property.

Therefore, there has been a great demand for a storage device which has the superior points of the magnetic tape and the disc-type storage medium such as the optical disc, which is a storage device of a low price, large capacity, and excellent random accessibility as well as saving property.

As a method for increasing the capacity of the disc-type storage medium such as the optical disc that is superior in terms of the random accessibility and the saving property, for example, there is a method proposed as shown in Patent Document 1 which stacks a plurality of recording media to be housed in a single case, develops the storage media extracted from the case, and loads them simultaneously to a plurality of recording/reproducing devices.

However, with such method, it is necessary to connect each recording medium with a special disc connector and allow connecting/separating actions between the storage media. Thus, the recording media need to be in a special structure, so that conventional production facilities cannot be utilized. This results in increasing the price. Further, each storage medium cannot be easily exchanged individually.

As the structure with which a plurality of recording media are stacked and housed in a single case, there are also proposed an optical disc cartridge disclosed in Patent Document 2, a continuous driving device disclosed in Patent Document 3, and a disc reproducing device disclosed in Patent Document 4. However, all of those are simply the devices which extract the recording medium one by one from a plurality of stacked recording media and set the medium to a recording/reproducing device, and those are not structured to load the plurality of recording media to a plurality of recording/reproducing devices simultaneously.

Among those, particularly the disc reproducing device of Patent Document 4 is disclosed in regards to a point which makes it easy to extract the recording medium that is a target to be drawn out through shifting the recording medium downwards when drawing out one of the stacked recording media to increase a gap between the recording medium and the recording medium positioned on the upper side thereof. However, this simply makes it easy to extract a single piece of recording medium, and the gap between the recording medium as the drawing target and the recording medium placed thereunder becomes decreased inversely from the above case. Thus, all the gaps between the recording media cannot be increased simultaneously. Therefore, it is not possible at all to achieve the object of developing the stacked recording media and loading those to a plurality of recording/reproducing device simultaneously.

Patent Document 1: Japanese Unexamined Patent Publication 2004-145994 (FIG. 1, FIG. 2)
Patent Document 2: Japanese Unexamined Patent Publication 2007-172726 (FIG. 1, FIG. 4, FIG. 5)
Patent Document 3: Japanese Unexamined Parent Publication Hei 8-31072 (FIG. 1, FIG. 2)
Patent Document 4: Japanese Unexamined Patent Publication Hei 10-283709 (FIG. 1, FIG. 6, Paragraph 0036)

DISCLOSURE OF THE INVENTION

Problems to be Solved by the Invention

An object of the present invention is to provide a stacking type tray, a tray developing mechanism, and a stacking type tray developing system, which can compactly stack and house disc-type recording media without forming the disc-type recording media in a special structure, and can form a proper gap between each of the recording media for making it possible to load the disc-type recording media to a plurality of recording/reproducing devices simultaneously.

Means for Solving the Problems

The stacking type tray of the present invention is a stacking type tray formed by stacking trays for loading disc-type recording media in thickness direction. In order to achieve the foregoing object, the stacking type tray particularly includes tray operation portions provided in a circumferential section of each of the trays, which do not overlap in the thickness direction with any other trays in a state where all the trays are being stacked.

Further, the tray developing mechanism of the present invention is a tray developing mechanism for forming a gap in a predetermined size between each of the trays by developing each of the trays of the stacking type tray described above in the thickness direction. In order to achieve the foregoing object, the mechanism particularly includes: a tray distributing/holding portion including supporting portions for supporting each of the trays, which are provided by corresponding to the positions of the tray operation portions with the gap formed therebetween in the thickness direction so that each of the supporting portions do not overlap in the thickness direction with each other; and a tray distributing up/down table which moves up and down in the thickness direction along the tray distributing/holding portion by supporting a bottom-face of the tray located on a lowermost layer from the bottom side.

The stacking type tray developing system of the present invention is a stacking type tray developing system which includes: a stacking type tray formed by stacking a plurality of trays having tray operation portions not overlapping with other trays in thickness direction provided in circumferential sections; and a tray developing mechanism for forming a gap in a predetermined size between each of the trays by developing each of the trays of the stacking type tray in the thickness direction, wherein the tray developing mechanism includes: a tray distributing/holding portion including supporting portions for supporting each of the trays, which are provided by corresponding to the positions of the tray operation portions with the gap formed therebetween in the thickness direction so that each of the supporting portions do not overlap with each other in the thickness direction; and a tray distributing up/down table which moves up and down in the thickness direction along the tray distributing/holding portion by supporting a bottom-face of the tray located on a lowermost layer from the bottom side.

Effects of the Invention

The stacking type tray of the present invention is capable of stacking the disc-type recording media and housing them compactly.

Moreover, the tray operation portions not overlapping with each other in the thickness direction even when all the trays are stacked are provided in the circumferential sections of each tray, so that the gaps between each of the trays can be adjusted in accordance with the arranged condition of the plurality of recording/reproducing devices through relatively shifting each of the trays along the thickness direction by utilizing the tray operation portions.

Further, with the tray developing mechanism and the stacking type tray developing system of the present invention, it is possible to adjust the gaps between each of the trays to be suited for the arranged state of the plurality of recording/reproducing devices by automatically forming the gaps in a preset size between each of the trays through simply moving up and down the tray distributing up/down table where the stacking type tray is loaded along the tray distribution holding portion.

BEST MODES FOR CARRYING OUT THE INVENTION

Next, best modes for carrying out the invention will be described in details by referring to specific examples.

FIG. 1 is a plan view showing a schematic structure of each tray by referring to a case where a stacking type tray 101 is formed by stacking nine pieces of trays for loading optical discs 100 as a type of disc-type recording media in the thickness direction.

In this exemplary embodiment, the tray located at the uppermost layer in a stacked state is called a first tray 11, the tray thereunder is called a second tray 12, and the trays thereunder are also called as a third tray 13, a fourth tray 14, - - - , and a ninth tray 19 in the same manner. In FIG. 1, illustrations of the trays from the third tray 13 to the eighth tray 18 are omitted.

The basic structures of the first tray 11 to the ninth tray 19 are the same, so that the structures in common to the first tray 11 to the ninth tray 19 will be described herein by referring to the case of the first tray 11 shown in FIG. 2.

All of the first tray 11 to the ninth tray 19 have a substantially rectangular external shape, and a substantially circular recessed part 40 for housing the optical disc 100 is formed in the center thereof as in FIG. 2, for example. The inside diameter of the recessed part 40 is slightly larger than the outer diameter of the optical disc 100, and the depth of the recessed part 40 is slightly deeper than the thickness of the optical disc 100.

The first tray 11 includes protrusions 11a, 11a forming tray operation portions at two points on the left side out of two opposing sides, i.e., the left side and right side shown in FIG. 2, and also includes protrusions 11b, 11b forming tray operation portions at two points on the right side.

On one of the opposing two sides of the first tray 11 located on the uppermost layer, i.e., on the left side shown in FIG. 2, the protrusions 11a, 11a are formed in substantially the center of the side with a small gap $\delta$ provided therebetween. In the meantime, on the other side out of the two opposing sides, i.e., on the right side shown in FIG. 2, the protrusions 11b, 11b are formed on both ends of that side.

The structure of the second tray 12 located on the second uppermost layer is basically the same structure as that of the first tray 11. However, as shown in FIG. 3, those structures are different in respect that: protrusions 12a, 12a on one of the two opposing sides, i.e., on the left side shown in FIG. 3, are shifted towards the outer side along the direction of that side compared to the protrusions 11a, 11a on the left side of the first tray 11 by an amount of the small gap $\delta$; and protrusions 12b, 12b on the other side of the two opposing sides, i.e., on the right side shown in FIG. 3, are shifted towards the inner side along the direction of that side compared to the protrusions 11b, 11b on the right side of the first tray 11 by an amount of the small gap $\delta$.

In the relations thereafter between the (n−1)-th tray and the n-th tray (where n is a natural number expressed as $2 \leqq n \leqq 9$) are the same as this. Each of the protrusions on the left side of the n-th tray is provided at positions shifted towards the outer side along that side by an amount of $\delta$ from the positions of each of the protrusions on the left side of the (n−1)-th tray, and each of the protrusions on the right side of the n-th tray is provided at positions shifted towards the inner side along that side by an amount of $\delta$ from the positions of each of the protrusions on the right side of the (n−1)-th tray.

That is, the isolated distance between each of the protrusions is increased in order according to the stacking order of the tray from the uppermost layer side on the one (left side) of the two opposing sides, while the isolated distance between each of the protrusions is decreased in order according to the stacking order of the tray from the uppermost layer side on the other one (right side) of the two opposing sides. At last, on the ninth tray 19 located on the lowermost layer, protrusions 19a, 19a are formed on both ends of one of the two opposing sides, i.e., on the left side of the ninth tray 19 shown in FIG. 1, and protrusions 19b, 19b are formed substantially in the center of the side with the small gap $\delta$ provided therebetween on the other side of the two opposing sides, i.e., on the right side of the ninth tray 19 shown in FIG. 1.

In this manner, the isolated distance between each of the protrusions on one side (left side) of the two opposing sides is increased by an amount of "2·$\delta$" according to the stacking order of the tray, and the isolated distance between each of the protrusions on the other side (right side) of the two opposing sides is decreased by an amount of "2·$\delta$" according to the stacking order of the tray. As a result, the sum of the isolated distance between the two protrusions located on one side (left side) and the isolated distance between the two protrusions located on the other side (right side) is always about the same as the length of one side (also same as the length on the other side).

That is, the fact that the sum of the isolated distance between the two protrusions located on one side (left side) and the isolated distance between the two protrusions located on the other side (right side) is always about the same as the length of one side (also same as the length on the other side) has technically the same meaning as: the two protrusion on one side (left side) of the tray located on the uppermost layer are located in substantially the center of that side while the two protrusions on the other side (right side) of the tray located on the uppermost layer are located at both ends of that side; the two protrusion on one side (left side) of the tray located on the lowermost layer are located on both ends of that side while the two protrusions on the other side (right side) of the tray located on the lowermost layer are located in substantially the center of that side; and the forming positions of the protrusions are changed at a specific interval from the uppermost layer to the lowermost layer, e.g., by an amount of δ.

Therefore, the value of δ and the width of the protrusions can be made relatively larger when the number of trays to be stacked is smaller. In the meantime, when the number of trays to be stacked becomes larger, it is necessary to decrease the value of δ and the width of the protrusions relatively.

Here, shown is a case where the gap δ is set to be substantially the same as the width of the protrusions. However, in a case where a small number of trays are stacked, the gap δ may be widened. In a case where a still larger number of trays are stacked, the gap δ may be set to be slightly smaller with respect to the width of the protrusions within such an extent that the trays closest to each other along the stacking direction, i.e., the (n−1)-th tray and the n-th tray, do not completely overlap with each other.

The first tray 11 to the ninth tray 19 are stacked along the thickness direction to be overlapped as shown in FIG. 5, and housed in a tray loading portion 43 on a tray base 20 for storing or transporting those trays collectively.

As shown in FIG. 4, semi-circular arc fitting protrusions projected towards the inner side are formed in the frame part on both sides of the tray base 20. The fitting protrusions are engaged with the semi-circular arc fitting recessed portions on both sides of the first tray 11 to the ninth tray 19 so that the position shift of the first tray 11 to the ninth tray 19 with respect to the tray base 20 can be prevented.

Further, the width of the tray loading portion 43 in the tray base 20 is formed in a size equal to or less than the width W of the tray shown in FIG. 2, so that the protrusion 11a-19a and 11b-19b of the first tray 11 to the ninth tray 19 are all protruded towards the outer side of the tray base 20 while the first tray 11 to the ninth tray 19 are housed in the tray loading portion 43 by being stacked along the thickness direction as shown in FIG. 6, for example.

By following the above-described condition, i.e., under the condition where the sum of the isolated distance between the two protrusions located on one side (left side) and the isolated distance between the two protrusions located on the other side (right side) is always about the same as the length of one side (also same as the length on the other side), more desirably, by following not only that condition but also such a condition that the two protrusions of one side (left side) of the tray located at least on the uppermost layer or the lowermost layer are located substantially in the center of the corresponding side and the two protrusions of the other side (right side) are located on both ends of the corresponding side, the centroid of each tray comes at a position inside a trapezoid or rectangular virtual plane of each tray formed by having the four protrusions as the vertexes as shown in FIG. 5. Thus, all of the tray can be stably held by supporting a total of four protrusions provided on each tray from the bottom side.

FIG. 7 is an illustration showing an example of a state of the protrusions that may be formed when protrusions are formed on both ends of each of the two opposing sides of the first tray located on the uppermost layer and the isolated distance of the two protrusions in each of the sides is decreased in order according to the stacking order, and it is an example of an undesired tray structure.

When such structure is employed, the two protrusions are located in substantially the center of the respective sides in both the left side and the right side of the tray. Thus, the rectangular virtual plane of the tray formed by having the four protrusions as the vertexes becomes extremely small, so that it is extremely difficult to stably hold the tray even if the tray is held by supporting a total of four protrusions provided on the tray from the bottom side.

Even in a case where the protrusions are formed on both ends of each of the two opposing sides of the tray located on the uppermost layer and the structure of decreasing the isolated distance between the two protrusions of each side in order according to the stacking order is employed, the stability when holding the trays can be secured to some extent when the protrusions on the left side and the protrusions on the right side are provided by restricting the forming positions in sections of A and B shown in FIG. 7, for example. However, in that case, the area where the protrusions can be provided without being overlapped along the stacking direction becomes extremely decreased, so that it becomes necessary to decrease the width of the protrusions and the shift amount of the protrusions extremely. This results in decreases in the protrusions as well as in the holding strength and making the accuracy requirement severer, or the number of stackable trays becomes extremely restricted as a result of securing the width of the protrusions and the shift amount of the protrusions as much as necessary.

In the first tray 11 to the ninth tray 19 of the exemplary embodiment formed according to the above-described conditions, the centroid of each tray is located inside the trapezoid or rectangular virtual plane of each tray formed by having the four protrusions as the vertexes, and the area of the trapezoid or rectangular virtual plane of each tray formed by having the four protrusions as the vertexes is sufficiently large. Thus, it is possible to stack a sufficient number of trays, e.g., nine or more pieces of trays, to be overlapped without specifically decreasing the width of the protrusions and the shift amount of the protrusions. Moreover, as shown in FIG. 6, even under a state where all the trays are being stacked, there is no such issue generated at all that any of the protrusions of the trays are overlapped with any other trays along the thickness direction.

FIG. 8 shows a state where the stacking type tray 101 formed by stacking all the trays from the first tray 11 to the ninth tray 19 are stacked is viewed from the bottom face side along the stacking direction.

None of the protrusions of each tray is overlapped with the protrusions of any other trays in the thickness direction of the trays, i.e., from the stacking direction of the trays.

Further, through holes 42 used for aligning the position and for stably holding each tray are uniformly opened in all the protrusions 11a-19a and 11b-19b as shown in FIG. 8, FIG. 2, or the like.

FIG. 9 is a plan view showing one exemplary embodiment of a tray developing mechanism for forming a gap in a predetermined size between each of the trays by developing each of the trays from the first tray 11 to the ninth tray 19 which configure the stacking type tray 101 in the stacking direction of the trays, and FIG. 10 is a perspective view thereof.

The main part of the tray developing mechanism 102 according to the exemplary embodiment is formed with: a housing portion 45 which houses a plurality of stacking type trays 101; a developing portion 50 including a table 2 functioning as a tray distributing up/down table and frames 6a, 6b functioning as a tray distributing/holding portion; and a transporting portion 60.

Further, a recording/reproducing portion 66 is formed with nine pieces of recording/reproducing devices 201 to 209 provided vertically in a continuous manner, and it is utilized when writing and reading information to/from optical discs 100 extracted from the first tray 11 to the ninth tray 19.

As shown in FIG. 9 and FIG. 10, the housing portion 45 includes a plurality of stockers 1 arranged in parallel for housing the optical disc transportation bodies 41 including the stacking type trays 101 housed on the tray base 20.

Further, the housing portion 45 is provided with a picker (not shown) which functions as a developing-target tray transporting mechanism which extracts the optical disc transportation body 41 selected as the developing target from the stocker 1 and transports it to the table 2 of the developing portion 50.

The picker is in a similar structure as those used in archive library devices and the like on the market, so that explanations thereof are omitted.

As shown in FIG. 9 and FIG. 10, the table 2 provided to the developing portion 50 is attached to a vertical actuator 4 via a bracket 3. The vertical actuator 4 is a driving source for moving the table 2 towards the tray thickness direction, i.e., the direction perpendicular to the paper face in FIG. 9 (top-and-bottom direction in FIG. 10), and the base part thereof is fixed to a base plate 5 via an L-letter shape stay as shown in FIG. 10.

FIG. 12 is a fragmentary plan view of the developing portion 50 taken from the above, and FIG. 13 is a side view of the developing portion 50 taken along an arrow A of FIG. 12.

As shown in FIG. 13, protrusion bases 31a-39a, 31b-39b including protruded supporting portions 21a-29a, 21b-29b for supporting the protrusions 11a-19a, 11b-19b of the first tray 11 to ninth tray 19 configuring the stacking type tray 101 are integrally attached to the frames 6a, 6b which function as the tray distributing/holding portion of the developing portion 50.

The basic structures of the protrusion bases 31a-39a, 31b-39b are the same. Thus, the detailed structures thereof are shown in FIG. 14 by referring to a case of the protrusion bases 31a, 31b which correspond to the first tray 11 shown in FIG. 1, the protrusion bases 32a, 32b which correspond to the second tray 12, and the protrusion bases 39a, 39b which correspond to the ninth tray 19.

The protrusion base 31a includes the supporting portions 21a, 21a which correspond to the protrusions 11a, 11a of the first tray 11 stacked on the uppermost layer, and the protrusion base 31b includes the supporting portions 21b, 21b which correspond to the protrusions 11b, 11b of the first tray 11.

The interval between the supporting portions 21a and 21a of the protrusion base 31a is equivalent to the interval between the protrusions 11a and 11a of the first tray 11, and the interval between the supporting portions 21b and 21b of the protrusion base 31b is equivalent to the interval between the protrusions 11b and 11b of the first tray 11.

Further, positioning pins 44, 44 which are inserted and fitted into the through holes 42, 42 provided to the protrusions 11a, 11a of the first tray 11 are vertically provided to the supporting portions 21a, 21a of the protrusion base 31a. Similarly, positioning pins 44, 44 which are inserted and fitted into the through holes 42, 42 provided to the protrusions 11b, 11b of the first tray 11 are also vertically provided to the supporting portions 21b, 21b of the protrusion base 31b.

The protrusion base 31a is attached horizontally at a position in the vicinity of the top end part of the inner-side face of the frame 6a which configures a part of the tray distributing/holding portion as in FIG. 13. Further, the protrusion base 31b is attached horizontally at a position in the vicinity of the top end part of the inner-side face of the frame 6b which configures a part of the tray distributing/holding portion, i.e., at the same height as the case of the protrusion base 31a.

FIG. 15 is an illustration showing a corresponding relation of the attaching positions of the protrusion base 31a and the protrusion base 31b.

As shown in FIG. 15, the attaching positions of the frames 6a, 6b with respect to the base plate 5 are adjusted so that the isolated distance L between the positioning pin 44 provided to the supporting portion 21a of the protrusion base 31a and the positioning pin 44 provided to the supporting portion 21b of the protrusion base 31b becomes the same as the isolated distance between the through hole 42 provided to the protrusion 11a of the first tray 11 and the through hole 42 provided to the protrusion 11b of the first tray 11, i.e., the size W shown in FIG. 2. The frames 6a and 6b are perpendicular to the base plate 5.

The structures of the protrusion bases 32a-39a and 32b-39b are basically the same as the structure of the protrusion bases 31a and 31b described above.

That is, the protrusion base 32a includes the supporting portions 22a, 22a which correspond to the protrusions 12a, 12a of the second tray 12 while the protrusion base 32b includes the supporting portions 22b, 22b which correspond to the protrusions 12b, 12b of the second tray 12, the protrusion base 33a includes the supporting portions 23a, 23a which correspond to the protrusions 13a, 13a of the third tray 13 while the protrusion base 33b includes the supporting portions 23b, 23b which correspond to the protrusions 13b, 13b of the third tray 13, etc., and the protrusion base 39a includes the supporting portions 29a, 29a which correspond to the protrusions 19a, 19a of the ninth tray 19 while the protrusion base 39b includes the supporting portions 29b, 29b which correspond to the protrusions 19b, 19b of the ninth tray 19.

The attaching state of the protrusion bases 31a-39a and 31b-39b with respect to the frames 6a, 6b is as shown in FIG. 13, in which the protrusion bases 31a, 31b are attached at the positions in the vicinity of the top end part of the inner-side face of the frames 6a, 6b, and the protrusion bases 32a-39a, 32b-329b are attached in order thereunder.

The attaching interval of the protrusion bases neighboring to each other on top and bottom is equivalent to the pitch of arranging the recording/reproducing devices 201-209 in the top-and-bottom direction in the recording/reproducing portion 66.

That is, with this exemplary embodiment, the supporting portions 21a-29a, 21b-29b for respectively supporting the first tray 11 to the ninth tray 19 are attached to the frames 6a, 6b functioning as the tray distributing/holding portion at a predetermined interval, i.e., at the interval corresponding to the pitch of providing the recording/reproducing device 201-209 in the top-and-bottom direction, so as to correspond to the positions of the protrusions 11a-19a, 11b-19b of the first tray 11 to the ninth tray 19 and so as not to overlap with each other along the tray thickness direction, i.e., the top-and-bottom direction which is the stacking direction.

The corresponding relations of the protrusions 11a-19a, 11b-19b of the first tray 11 to the ninth tray 19, the supporting portions 21a-29a, 21b-29b for respectively supporting the first tray 11 to the ninth tray 19, and the protrusion bases 31a-39a, 31b-39b are shown in reference charts of FIG. 16.

Note, however, that the third tray 13 to the eighth tray 18 and the protrusion bases 33a-38a, 33b-38b are omitted in FIG. 16.

Practically, the protrusions 11a, 11a and the supporting portions 21a, 21a, the protrusions 11b, 11b and the supporting portions 21b, 21b, etc., the protrusions 19a, 19a and the supporting portions 29a, 29a, and the protrusions 19b, 19b and the supporting portions 29b, 29b overlap with each other in the tray thickness direction, i.e., the top-and-bottom direction which is the stacking direction. However, in order to clearly illustrate the corresponding relations between the protrusions and the supporting portions, those are illustrated in FIG. 16 by offsetting the protrusion bases 31a-39a to the left side with respect to the first tray 11 to the ninth tray 19 and offsetting the protrusion bases 31b-39b to the right side with respect to the first tray 11 to the ninth tray 19.

The width of each supporting portion is formed to be slightly narrower than the width of the protrusions in order to avoid interferences of the corresponding protrusion with other neighboring protrusions. For example, the width of the supporting portions 21a, 21a is slightly narrower than the width of the protrusions 11a, 11a of the first tray 11 and the protrusions 12a, 12a of the neighboring second tray 12, so that the protrusions 12a, 12a of the second tray 12 can be moved along the top-and-bottom direction, i.e., the vertical direction of the paper face of FIG. 16, over the supporting portions 21a, 21a without interfering with the supporting portions 21a, 21a. Thus, only the protrusions 11a, 11a of the first tray 11 are supported by the interference with the supporting portions 21a, 21a.

As in the case of the protrusions of the tray side described above, each of the supporting portions 21a-29a, 21b-29b never overlaps with any of other supporting portions in the tray thickness direction, i.e., when viewed from the direction perpendicular to the paper face of FIG. 9.

In this exemplary embodiment, the protrusions 11a, 11a of the first tray 11 as well as the protrusions 19b, 19b of the ninth tray 19 (see FIG. 1), the supporting portions 21a, 21a of the protrusion base 31a as well as the supporting portions 29b, 29b of the protrusion base 39b (see FIG. 16) are formed separately in two pieces. However, those may be formed as substantially one body.

In that case, the protrusion, i.e., the tray operation portion, of the first tray 11 is provided at one point on one side (left side) of the two opposing sides and at two points on the other side (right side) of the two opposing sides (provided at three points in total).

In the initial state of the tray developing mechanism 102, the table 2 functioning as a tray distributing up/down table is located at a standby position that is on the upper side than the protrusion bases 31a, 31b located on the uppermost part as shown in FIG. 13.

The standby position herein is a developing operation standby position when developing the stacked optical discs 100 extracted along the tray bases 20 from the stockers 1, and it is different from a standby position when retrieving the optical discs 100 mounted to the recording/reproducing devices 201-209 and stacking them again, i.e., a retrieving operation standby position (see FIG. 23).

FIG. 17 is a side view showing the transporting portion 60 and the recording/reproducing portion 66, FIG. 18 is a plan view showing the transporting portion 60 and the recording/reproducing portion 66, and FIG. 19 is an enlarged perspective view showing an adsorption arm 61 provided to the transporting portion 60.

As shown in FIG. 17 and FIG. 18, the main part of the transporting portion 60 is configured with: nine absorption arms 61 continuously provided in the top-and-bottom direction in accordance with the number of optical discs 100 to be stacked; a connector metal fitting 63 which integrally attach those absorption arms 61; a vertical actuator 64 which integrally moves the nine absorption arms 61 vertically via the connector metal fitting 63; and a horizontal actuator 65 which integrally moves the nine absorption arms 61 in the horizontal direction via the vertical actuator 64 and the connector metal fitting 63.

That is, it is possible to move the nine absorption arms 61 integrally along the vertical and horizontal directions of FIG. 17 with a combination of the vertical actuator 64 and the horizontal actuator 65.

The attaching interval of the absorption arms 61 in the top-and-bottom direction is equivalent to the attaching interval of the protrusion bases 31a-39a, 31b-39b which are fixed to the frames 6a, 6b configuring the tray distributing/holding portion along the top-and-bottom direction, i.e., equivalent to the pitch of providing the recording/reproducing devices 201-209 in the top-and-bottom direction in the recording/reproducing portion 66.

Further, as shown in FIG. 19, absorption pads 62 in set of three each for absorbing the top-face side of the optical disc 100 by avoiding the hole in the center of the optical disc 100 are fixed to the tip end of each absorption arm 61.

Each of the absorption pads 62 is a suction member made with rubber or the like. It is connected to a vacuum pump, not shown, via a pressure-resistant tube or the like so as to perform absorbing work and releasing work of the optical disc 100 with vacuum through on/off operation of the vacuum pump, operation of open/close valve, or the like.

Next, actions performed when extracting the stacking type tray 101 from the stockers 1 of the housing portion 45, developing the stacked optical discs 100, and mounting those to the recording/reproducing devices 201-209 of the recording/reproducing portion 66 as well as operations performed when retrieving the optical discs 100 mounted to the recording/reproducing devices 201-209, stacking the discs 100 again, and returning them to the stockers 1 will be described in a specific manner by referring to FIG. 20-FIG. 25.

For the sake of clearly illustrating the structure of each portion, the housing portion 45 which corresponds to the background of the frames 6a, 6b is omitted in FIG. 21 and FIG. 22, and the housing portion 45 and the transporting portion 60 corresponding to the background of the frames 6a, 6b are omitted in FIG. 23.

In the initial state, as has been described above, the table 2 functioning as the tray distributing up/down table is located at the developing operation standby position as in FIG. 13, i.e., the standby position on the upper side than the protrusion bases 31a, 31b. Further, the absorption arms 61 and the vertical actuator 64 are retracted at positions offset towards the flank side from the developing portion 50 as shown in FIG. 10, for example.

Thus, first, a picker (not shown) provided to the housing portion 45 is operated to extract the optical disc transportation body 41 selected as the developing target, i.e., the selected stacking type tray 101 and the tray base 20 to which the stacking type tray 101 is housed from the stocker 1. After loading it on the table 2 of the developing portion 50 as in FIG. 20, the picker (not shown) is returned to the standby position.

Then, the vertical actuator 4 is driven to move down the table 2 on which the optical disc transportation body 41 including the stacking type tray 101 and the tray base 20 is loaded along the frames 6a, 6b functioning as the tray distributing/holding portion.

In accordance with the moving-down action of the table 2 which supports the stacking type tray 101 from the bottom side via the tray base 20, first, the bottom faces of the protrusions 11a, 11b of the first tray 11 located on the uppermost layer of the stacking type tray 101 are abutted against the top faces of the supporting portions 21a, 21b of the protrusion bases 31a, 31b provided to the frames 6a, 6b functioning as the tray distributing/holding portion, and the first tray 11 is held at the positions of the protrusion bases 31a, 31b as shown in FIG. 21.

At this time, the positioning pins 44 of the supporting portions 21a, 21b are fitted into the through holes 42 of the protrusions 11a, 11b of the first tray 11, thereby preventing the position shift of the first tray 11.

The tray having the protrusions which abut against the supporting portions 21a, 21b is only the first tray 11. Thus, when the table 2 moves down further, the other trays, i.e., the second tray 12 to the ninth tray 19, along the table 2 and the tray base 20 are moved downwards while leaving the first tray 11 at the positions of the protrusion bases 31a, 31b.

Then, when the table 2 further moves down, the protrusions 12a, 12b of the second tray 12 are abutted against the top faces of the supporting portions 22a, 22b of the protrusion bases 32a, 32b, and the second tray 12 is held at the positions of the protrusion bases 32a, 32b as shown in FIG. 22.

At this time, the positioning pins 44 of the supporting portions 22a, 22b are fitted into the through holes 42 of the protrusions 12a, 12b of the second tray 12, thereby preventing the position shift of the second tray 12.

The tray having the protrusions which abut against the supporting portions 22a, 22b is only the second tray 12. Thus, when the table 2 moves down further, the other trays, i.e., the third tray 13 to the ninth tray 19, along the table 2 and the tray base 20 are moved downwards while leaving the second tray 12 at the positions of the protrusion bases 32a, 32b.

Thereafter, in accordance with the moving-down actions of the table 2, the third tray 13 is held at the positions of the protrusion bases 33a, 33b, the fourth tray 14 is held at the positions of the protrusion bases 34a, 34b, etc., and the ninth tray 19 is held at the positions of the protrusion bases 39a, 39b in the same manner described above. At last, the table 2 loading only the empty tray base 20 moves downwards to the under the protrusion bases 39a, 39b, and stops at the retrieving operation standby position.

FIG. 23 shows a state where all of the trays from the first tray 11 to the ninth tray 19 configuring the stacking type tray 101 are developed and held to the frames 6a, 6b functioning as the tray distributing/holding portion.

Then, the horizontal actuator 65 is driven to move the absorption arms 61 from the initial standby position as in FIG. 10 to be brought into a place between the frames 6a, 6b as shown in FIG. 18 so as to be positioned at approach points slightly above the first tray 11 to the ninth tray 19.

Then, the vertical actuator 64 is driven to move down the absorption arms 61, and the vacuum pump (not shown) is operated to absorb and hold the optical discs 100 on the first tray 11 to the ninth tray 19 to the absorption pads 62 as shown in FIG. 24.

During that time, drive-side trays 301-309 are ejected from each of the recording/reproducing devices 201-209 of the recording/reproducing portion 66 as in FIG. 25.

Then, the vertical actuator 64 is driven to move up the absorption arms 61 to be returned to the approach points.

Further, the horizontal actuator 65 is driven to move the absorption arms 61 in the horizontal direction to transport each of the optical discs 100 which are absorbed and held by the absorption pads 62 to the positions above the drive-side trays 301-309, and operation of the vacuum pump (not shown) is stopped to release the optical discs 100 from each of the absorption pads 62 so as to load each of the optical discs 100 on the drive-side trays 301-309 as shown in FIG. 25.

Thereafter, under control of a control device, not shown, the drive-side trays 301-309 on which the optical discs 100 are loaded are stored in the recording/reproducing devices 201-209 in the same manner as that of conventional cases to execute processing actions regarding recording or reproduction of data.

Then, when the processing actions regarding recording or reproduction of data are completed, the recording/reproducing devices 201-209 are ejected again from the drive-side trays 201-309.

Actions for retrieving, restacking, and returning the optical discs 100 to the stockers 1 are executed through back-tracing the actions described above.

That is, first, the vertical actuator 64 is driven to move down the absorption arms 61, and the vacuum pump (not shown) is operated to absorb and hold the optical discs 100 on the drive-side trays 301-309 with each of the absorption pads 62 as shown in FIG. 25, for example.

Then, the vertical actuator 64 is driven to retract the absorption arms 61 holding the optical discs 100 to positions slightly above the drive-side trays 301-309 so as to retrieve the drive-side trays 301-309 to the inside the recording/reproducing devices 201-209.

Further, the horizontal actuator 65 is driven to move the absorption arms 61 in the horizontal direction so as to set the positions of the absorption arms 61 to the approach points on the first tray 11 to the ninth tray 19.

Then, operation of the vacuum pump (not shown) is stopped to release the optical discs 100 from each of the absorption pads 62 so as to load each of the optical discs 100 on the first tray 11 to the ninth tray 19 as shown in FIG. 24, for example.

Then, the horizontal actuator 65 is driven to move the absorption arms 61 horizontally to return the absorption arms 61 to the retraction positions as in FIG. 10.

Then, the vertical actuator 4 is driven to move up the table 2 on which only the tray base 20 is loaded along the frames 6a, 6b functioning as the tray distributing/holding portion.

The state of the surroundings of the frames 6a, 6b at the point of starting the moving-up action of the table 2 is the same as the state shown in FIG. 23.

In accordance with the moving-up action of the table 2, first, the bottom face of the ninth tray 19 is brought up by abutting against the tray base 20 on the table 2, and the protrusions 19a, 19b of the ninth tray 19 are released upwards from the supporting portions 29a, 29b of the protrusion bases 39a, 39b and the positioning pins 44, 44, so that the ninth tray 19 starts to move upwards along with the table 2 and the tray base 20.

When the table 2 moves up further, the bottom face of the eighth tray 18 is brought up by abutting against the top face of the ninth tray 19 on the tray base 20, and the protrusions 18a, 18b of the eighth tray 18 are released upwards from the supporting portions 28a, 28b of the protrusion bases 38a, 38b and the positioning pins 44, 44, so that the eighth tray 18 starts to move upwards along with the table 2, the tray base 20, and the ninth tray 19.

Thereafter, in accordance with the moving-up actions of the table 2, the seventh tray 17 is retrieved by being stacked over the eighth tray 18, the sixth tray 16 is retrieved by being stacked over the seventh tray 17, etc., and the first tray 11 is retrieved by being stacked over the second tray 12 in the same manner described above. At last, all the trays from the first tray 11 to the ninth tray 19 are stacked on the tray base 20 to be overlapped.

Then, the table 2 on which the tray base 20 and the stacking type 101 configured with the first tray 11 to the ninth tray 19, i.e., the optical disc transportation bodies 41, are loaded moves up to the above the protrusion bases 31a, 31b, and then stops at the developing operation standby position described above.

This state is the same as the state shown in FIG. 20.

Thereafter, the picker (not shown) is operated to return the optical disc transportation bodies 41 to the housing places of the stockers 1. Thereby, a series of actions regarding developing of the stacking type trays, extraction of the optical discs from the developed trays, insertion of the optical discs to the plurality of recording/reproducing devices, writing and reading of data to/from the optical discs, retrieval of the optical discs from the recording/reproducing devices, storage of the optical discs to the trays, restacking of the trays, and retrieval of the stacking type trays to the stockers are all completed.

In the above, the exemplary embodiment which forms the tray operation portions by projecting the protrusions from the circumferential sections of the substantially rectangular trays towards the outer side has been described. However, it is also possible to form the tray operation portions by providing step-like notches in the circumferential sections of the substantially rectangular trays.

Next, an exemplary embodiment of a stacking type tray in which tray operation portions are formed by utilizing notches and an exemplary embodiment of the tray developing mechanism which is formed by corresponding to the stacking type tray will be described simply by referring to an example.

The differences with respect to the exemplary embodiment described above are only the shape of the tray operation portion in each tray, the shape of the protrusion base corresponding to the tray operation portion, and the shape of the supporting portion provided to the protrusion base. Thus, explanations regarding the overall structure of the tray developing mechanism are omitted, and only the structure of the tray itself and the peripheral structure of the frames 6a, 6b functioning as the tray distributing/holding portion will be described herein.

FIG. 26 is a plan view showing the shapes of a first tray 71 to a ninth tray 79 instead of the first tray 11 to the ninth tray 19 of the exemplary embodiment described above, and the structures of protrusion bases 91a-99a, 91b-99b and supporting portions 81a-89a, 81b-89b instead of the protrusion bases 31a-39a, 31b-39b and the supporting portions 21a-29a, 21b-29b of the exemplary embodiment described above.

However, as in the case of FIG. 16 used for explaining the exemplary embodiment described above, the corresponding relations between the tray operation portions and the supporting portions are illustrated in FIG. 26 by offsetting the protrusion bases 91a-99a to the left side with respect to the first tray 71 to the ninth tray 79 and offsetting the protrusion bases 91b-99b to the right side with respect to the first tray 71 to the ninth tray 79.

As shown in FIG. 26, step-like notches are provided in the four corners of the first tray 71 to the ninth tray 79, and the shapes thereof are different for each tray.

Further, considering each of the trays 71-79 individually, the step-like notches in each tray are bilaterally symmetrical and vertically symmetrical.

The members located on the left and right sides in each tray in FIG. 26 are the protrusion bases 91a-99a, 91b-99b provided on the inside face of the frames 6a, 6b functioning as the tray distributing/holding portion (see FIG. 30), and supporting portions 81a-89a, 81b-89b are provided at positions corresponding to the step-like notches of each of the trays 71-79.

The width of the supporting portions 81a-89a, 81b-89b is formed to be slightly narrower than the step width of the step-like notches of each of the trays 71-79.

FIG. 27 is a bottom view of a stacking type tray 103 formed by stacking the first tray 71 to the ninth tray 79 viewed from the bottom-face side, FIG. 28 is a perspective view of the stacking type tray 103 viewed from the bottom side obliquely, and FIG. 29 is an enlarged perspective view of the step-like notches formed in the first tray 71 to the ninth tray 79 shown in FIG. 27.

The trays are stacked in order of the ninth tray 79, the eighth tray 78, the seventh tray 77, etc., and the third tray 73, the second tray 72, and the first tray 71 from the bottom.

Hatchings of different patterns applied in FIG. 27 for each tray other than the ninth tray 79 make it easier to distinguish non-overlapping portions of each tray, i.e., the portions which do not overlap with each other in the stacking direction.

As shown in FIG. 27-FIG. 29, each tray has an exposed portion which is not blocked by other trays when the stacking type tray 103 is viewed from the bottom-face side. This exposed portion is the tray operation portion of each tray.

FIG. 30 is a perspective view showing the structure of the main part of the developing portion, i.e., the structure of the tray distributing/holding portion configured with the frames 6a, 6b, the developed state of the first tray 71 to the ninth tray 79 which are held from the bottom side by the supporting portions 81a-89a, 81b-89b provided to the protrusion bases 91a-99a, 91b-99b fixed to the frames 6a, 6b.

The stocker portion, the transporting portion, and the like are the same as those of the exemplary embodiment described above, so that illustrations thereof are omitted in FIG. 30.

The frames 6a and 6b are attached vertically to the base plate 5, as in the case of the exemplary embodiment described above. The protrusion bases 91a-99a, 91b-99b are attached to the inside face of the frames 6a, 6b at a specific interval, i.e., at the interval same as the pitch of providing the recording/reproducing devices 201-209 in the recording/reproducing portion 66 as in FIG. 25.

FIG. 31 is a plan view showing the top view of the frames 6a, 6b to which the protrusion bases 91a-99a, 91b-99b are attached.

The same type hatchings as those used in the explanation of FIG. 27 are applied to the top faces of each of the supporting portions 81a-89a, 81b-89b which are provided to the protrusion bases 91a-99a, 91b-99b to clearly show the portions which abut against the respective tray operation portions of the first tray 71 to the ninth tray 97.

As shown in FIG. 31, the areas of the supporting portions 81a-89a, 81b-89b abutting against each tray are exposed without being overlapped with each other from the inverted direction of the tray stacking direction, i.e., the direction where the first tray 71 is the uppermost layer.

As in the case of the exemplary embodiment described above, the developing work of the first tray 71 to the ninth tray 97 can be done in the tray developing mechanism to which the structures shown in FIG. 26-FIG. 31 are employed, through loading the stacked first tray 71 to the ninth tray 79, i.e., the stacking type tray 103, on the table 2 and moving it downwards from above the tray distributing/holding portion, i.e., from the frames 6a, 6b.

FIG. 32 is an explanatory diagram showing existence of interferences in each tray operation portion of the first tray 71 to the ninth tray 79 by taking the supporting portions 81a, 81b of the protrusion bases 91a, 91b located on the uppermost part of the tray distributing/holding portion as the reference. FIG. 33 is an explanatory diagram showing existence of interferences in each tray operation portion of the second tray 72 to the ninth tray 79 by taking the supporting portions 82a, 82b of the protrusion bases 92a, 92b located on the second uppermost part of the tray distributing/holding portion as the reference. FIG. 34 is an explanatory diagram showing existence of interferences in each tray operation portion of the third tray 73 to the ninth tray 79 by taking the supporting portions 83a, 83b of the protrusion bases 93a, 93b located on the third uppermost part of the tray distributing/holding portion as the reference.

As shown in FIG. 32, the notch portions of the second tray 72 to the ninth tray 79 do not interfere with the supporting portions 81a, 81b located on the uppermost part of the tray distributing/holding portion, so that all of the trays from the second tray 72 to the ninth tray 79 can pass through the supporting portions 81a, 81b and can be brought downwards along with the table 2 (not shown).

In the meantime, as shown in FIG. 32, the notch portions of the first tray 71 interfere with the supporting portions 81a, 81b located on the uppermost part of the tray distributing/holding portion. Thus, in a process where the table 2 (not shown) passes through the position of the supporting portions 81a, 81b, only the first tray 71 is supported by the supporting portions 81a, 81b, and held at the positions of the protrusion bases 91a, 91b shown in FIG. 30.

The tray operation portions of the first tray 71 abutting against the supporting portions 81a, 81b shown in FIG. 31 are the hatching part shown with a reference numeral 71 in FIG. 27.

Then, the table 2 (not shown) moves down further while keeping the first tray 71 at the positions of the protrusion bases 91a, 91b, and then reaches at the positions of the protrusion bases 92a, 92b.

As shown in FIG. 33, the notch portions of the third tray 73 to the ninth tray 79 do not interfere with the supporting portions 82a, 82b of the tray distributing/holding portion, so that all of the trays from the third tray 73 to the ninth tray 79 can pass through the supporting portions 82a, 82b and can be brought downwards along with the table 2 (not shown).

In the meantime, as shown in FIG. 33, the notch portions of the second tray 72 interfere with the supporting portions 82a, 82b of the tray distributing/holding portion. Thus, in a process where the table 2 (not shown) passes through the position of the supporting portions 82a, 82b, only the second tray 72 is supported by the supporting portions 82a, 82b, and held at the positions of the protrusion bases 92a, 92b shown in FIG. 30.

The tray operation portions of the second tray 72 abusing against the supporting portions 82a, 82b shown in FIG. 31 are the hatching part shown with a reference numeral 72 in FIG. 27.

Then, the table 2 (not shown) moves down further while keeping the second tray 72 at the positions of the protrusion bases 92a, 92b, and then reaches at the positions of the protrusion bases 93a, 93b.

As shown in FIG. 34, the notch portions of the fourth tray 74 to the ninth tray 79 do not interfere with the supporting portions 83a, 83b of the tray distributing/holding portion, so that all of the trays from the fourth tray 74 to the ninth tray 79 can pass through the supporting portions 83a, 83b and can be brought downwards along with the table 2 (not shown).

In the meantime, as shown in FIG. 34, the notch portions of the third tray 73 interfere with the supporting portions 83a, 83b of the tray distributing/holding portion. Thus, in a process where the table 2 (not shown) passes through the position of the supporting portions 83a, 83b, only the third tray 73 is supported by the supporting portions 83a, 83b, and held at the positions of the protrusion bases 93a, 93b shown in FIG. 30.

The tray operation portions of the third tray 73 abusing against the supporting portions 83a, 83b shown in FIG. 31 are the hatching part shown with a reference numeral 73 in FIG. 27.

Thereafter, in accordance with the moving-down actions of the table 2 (not shown), the fourth tray 74 is held at the positions of the protrusion bases 94a, 94b, the fifth tray 95 is held at the positions of the protrusion bases 95a, 95b, etc., and the ninth tray 99 is held at the positions of the protrusion bases 99a, 99b in the same manner described above. At last, the trays are developed in the state as shown in FIG. 30.

The other actions are completely the same as those of the above-described exemplary embodiment.

As in the case of the above-described exemplary embodiment, the centroid of each tray also comes to be located inside the rectangular virtual plane of each tray formed by having the tray operation portions of each tray as the vertexes in this exemplary embodiment. Thus, all the trays can be stably held by supporting a total of four tray operation portions provided to each tray from the bottom side.

Further, unlike the case of the above-described exemplary embodiment, the tray operation portions formed by the notches are provided instead of the protrusions. Therefore, the size of the width of the trays can be reduced compared to the case of the above-described exemplary embodiment.

With any of the exemplary embodiments described above, it is unnecessary to integrate the optical discs 100 themselves by utilizing any special connecting body or the like even though the exemplary embodiments are the structures which simultaneously handle a plurality of optical discs 100. Therefore, no special production facility is required for producing the storage media, and it is easy to exchange each of the optical discs 100 independently.

Further, the recording/reproducing portion 66 can be formed by simply stacking the recording/reproducing devices 201-209 on the market formed in a typical structure. Thus, even though the recording/reproducing portion is the structure which simultaneously handles a plurality of optical discs 100, it is unnecessary to design and manufacture any special recording/reproducing portions. Thus, the manufacturing cost for the entire device can be reduced.

Further, by employing the structure which can adjust the interval of providing the protrusion bases 31a-39a, 31b-39b (91a-99a, 91b-99b) in the top-and-bottom direction and the interval of providing the absorption arms 61 in the top-and-bottom direction, it becomes possible to easily deal with changes in the specifications of the recording/reproducing devices 201-209 such as changes in the thickness, etc.

The tray simply needs to have a function of loading and storing the optical discs 100, and it is unnecessary to rotate the optical discs 100 on the tray, to extract a single tray by a picker or the like, and almost unnecessary to have a clearance between the thickness of the tray itself as well as the tray and the optical discs 100 (see FIG. 6). Therefore, the optical discs 100 can be housed in the stocker in an extremely close-fitted state, thereby making it possible to form a compact device particularly when housing a great number of optical discs 100.

The exemplary embodiments have been described by referring to the case where nine pieces of optical discs 100 are used simultaneously. However, in practice, there is no problem at all in the action itself of the tray developing mechanism 102 even when the optical disc 100 is not loaded in any of the trays from the first tray 11 to 19 (71 to 79), i.e., having a blank tray, or any of the trays is being drawn out, as long as the stacking order of the first tray 11 to 19 (71 to 79) is correct.

Therefore, in a case where only the recording/reproducing device 205 shown in FIG. 25 breaks down, for example, it is possible to continue the operation state of other recording/reproducing devices 201-204, 206-209 excluding the recording/reproducing device 205 through taking out the optical disc 100 from the fifth tray 15 (75) or taking out only the fifth tray 15 (75) from the set of the stacking type tray 101 (103).

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

This Application is the National Phase of PCT/JP2008/069226, filed on Oct. 23, 2008 which claims the Priority right based on Japanese Patent Application No. 2007-302051 filed on Nov. 21, 2007 and the disclosure thereof is hereby incorporated by reference in its entirety.

INDUSTRIAL APPLICABILITY

The present invention makes it possible to provide the stacking type tray, the tray developing mechanism, and the stacking type tray developing system, which can compactly stack and house disc-type recording media without forming the disc-type recording media in a special structure, and can form a proper gap between each of the recording media for making it possible to load the disc-type recording media to a plurality of recording/reproducing devices simultaneously.

REFERENCE NUMERALS

Figure 1:
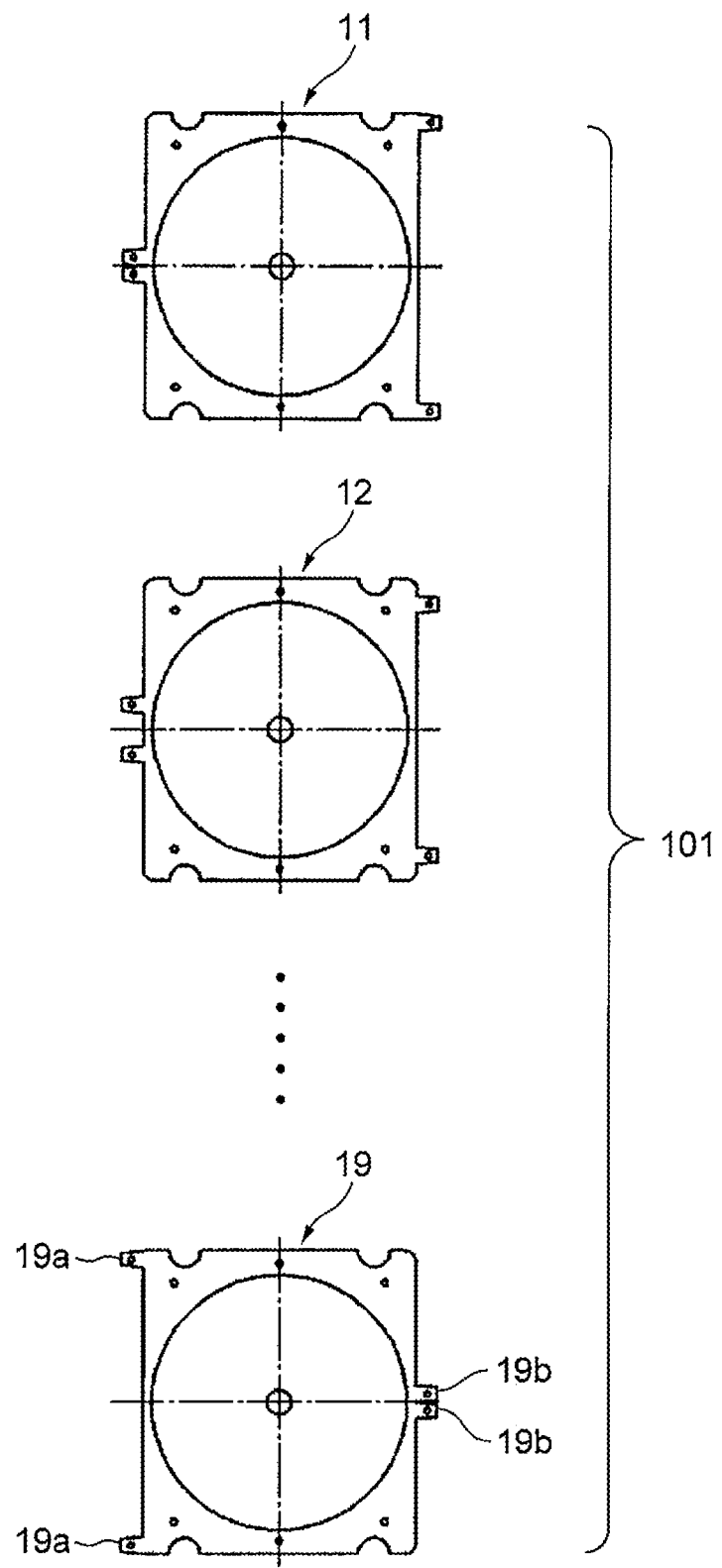
FIG. 1 is a plan view showing a schematic structure of a tray of an exemplary embodiment to which the present invention is employed by referring to a case where a stacking type tray is formed by stacking trays for loading optical discs as a type of disc-type recording media.
Figure 2:
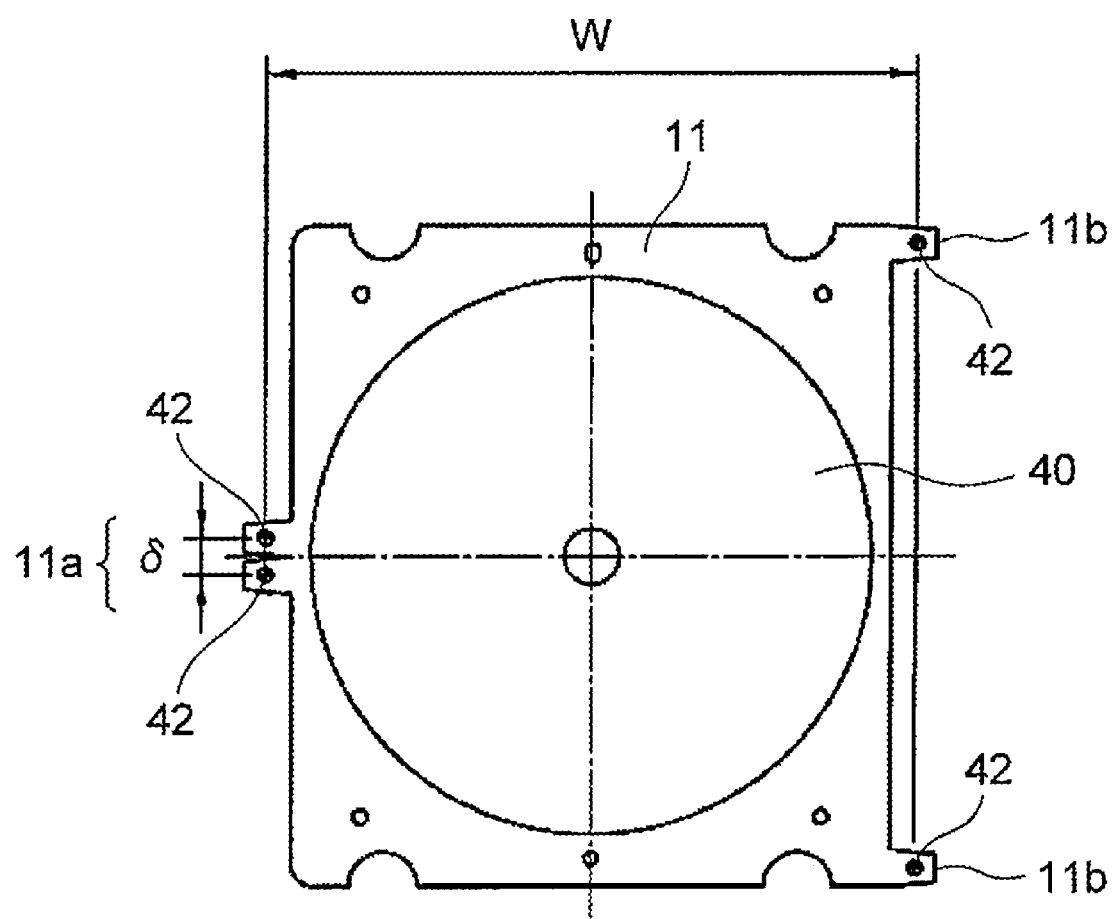
FIG. 2 is a plan view showing the structure of a first tray which forms a part of the stacking type tray.
Figure 3:
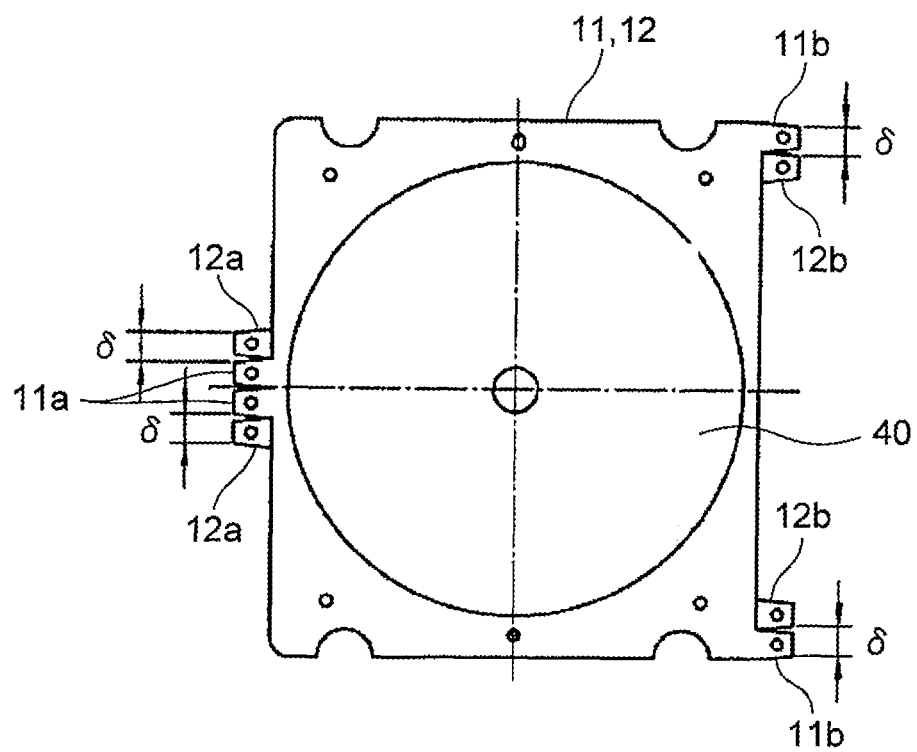
FIG. 3 is a plan view showing a state where the first tray and a second tray forming a part of the stacking type tray are stacked.
Figure 4:
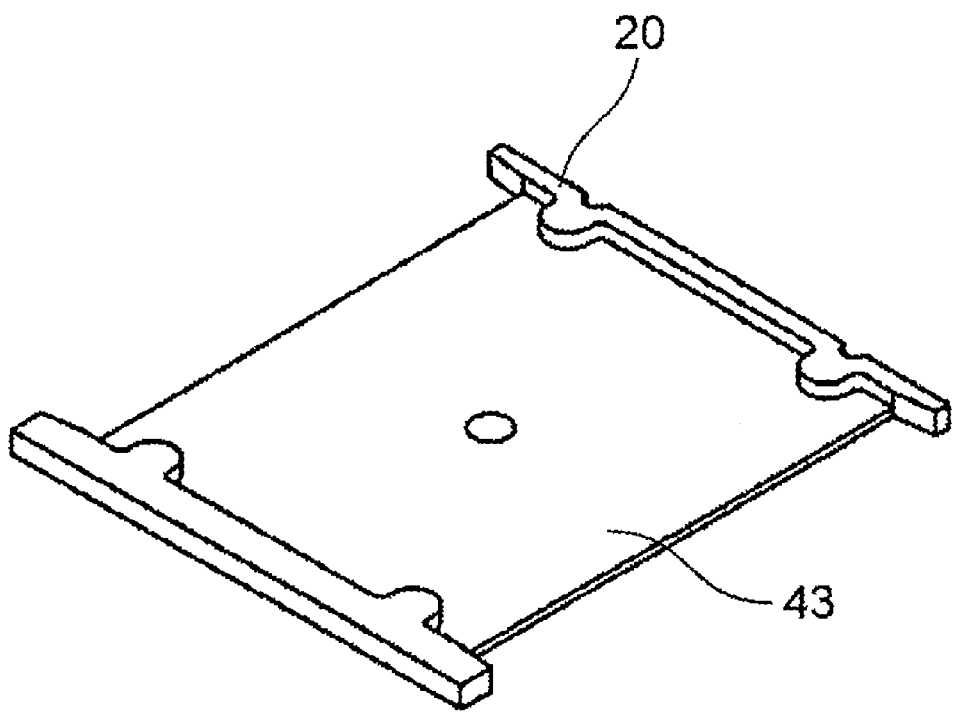
FIG. 4 is a perspective view showing the structure of a tray base for loading the stacking type tray.
Figure 5:
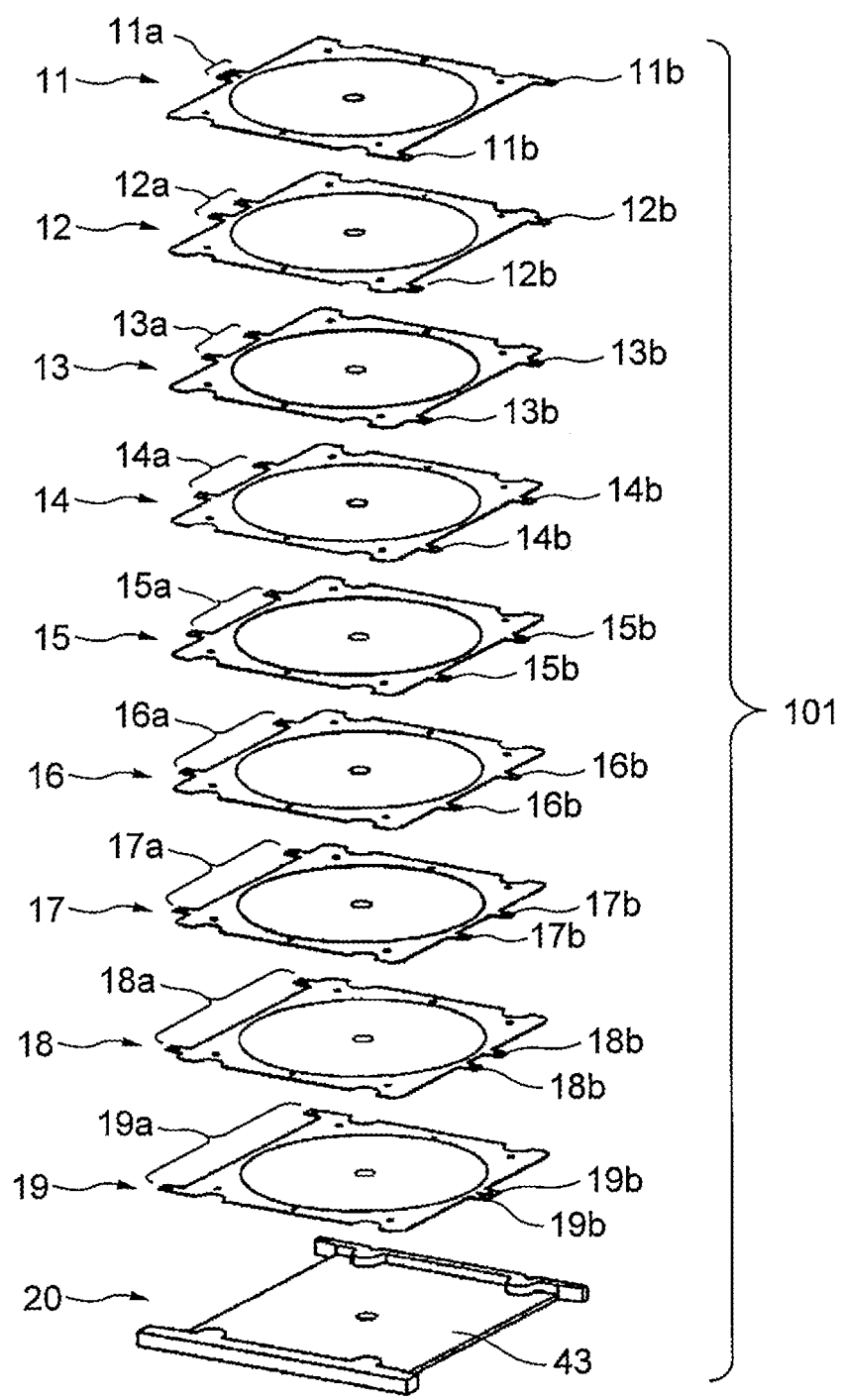
FIG. 5 is a perspective view showing a stacking state of the first tray to a ninth tray forming the stacking type tray with a gap provided therebetween.
Figure 6:
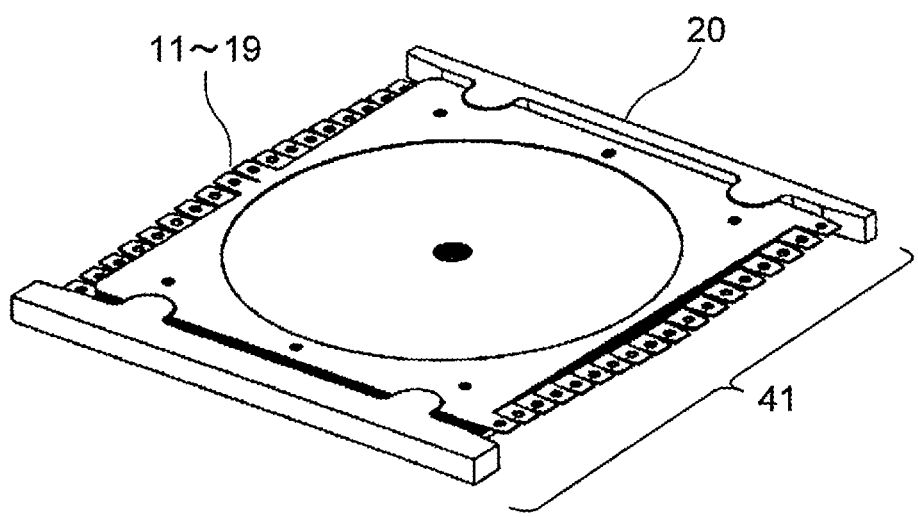
FIG. 6 is a perspective view showing a state where the stacking type tray is loaded on the tray base.
Figure 7:
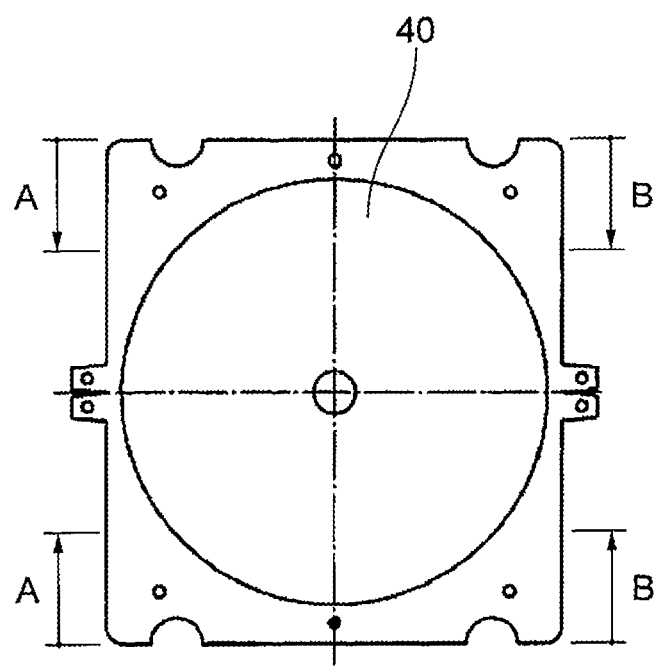
FIG. 7 is a plan view showing an undesired example of layout of protrusions provided to the tray.
Figure 8:
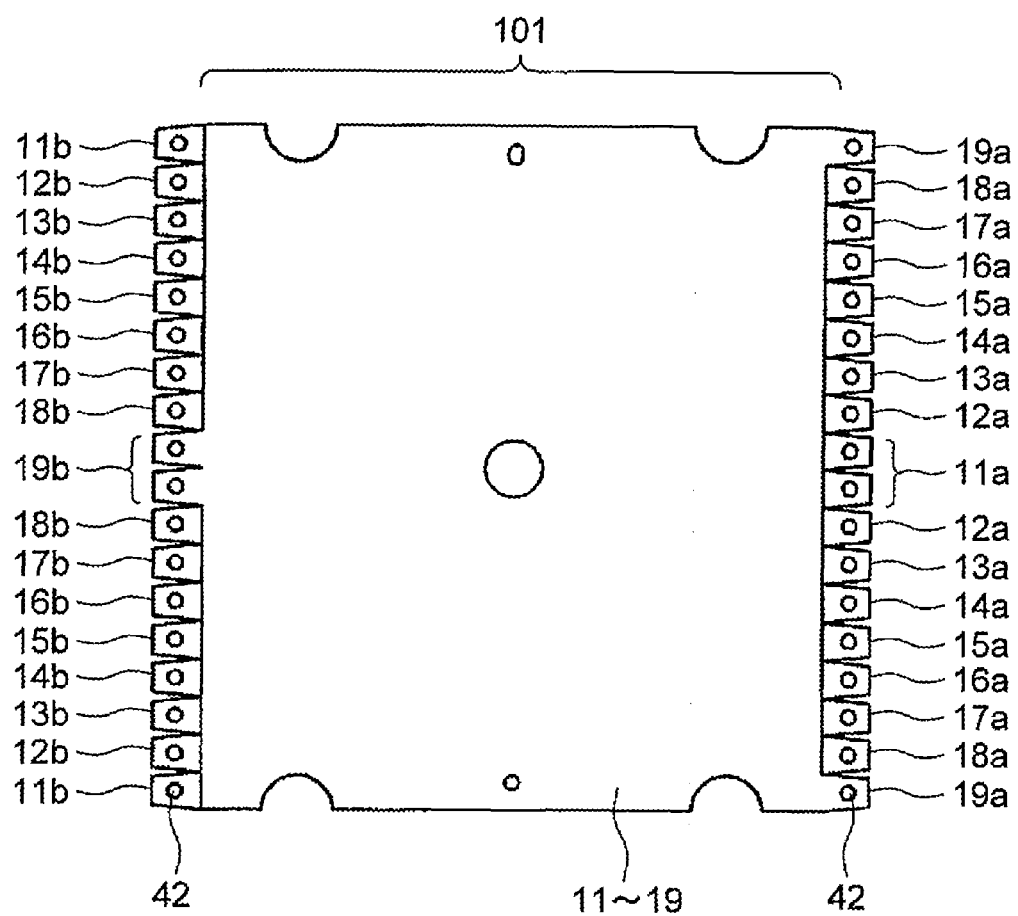
FIG. 8 is an illustration showing bottom-face side view of the stacking type tray formed by stacking all the trays along the tray stacking direction.
Figure 9:
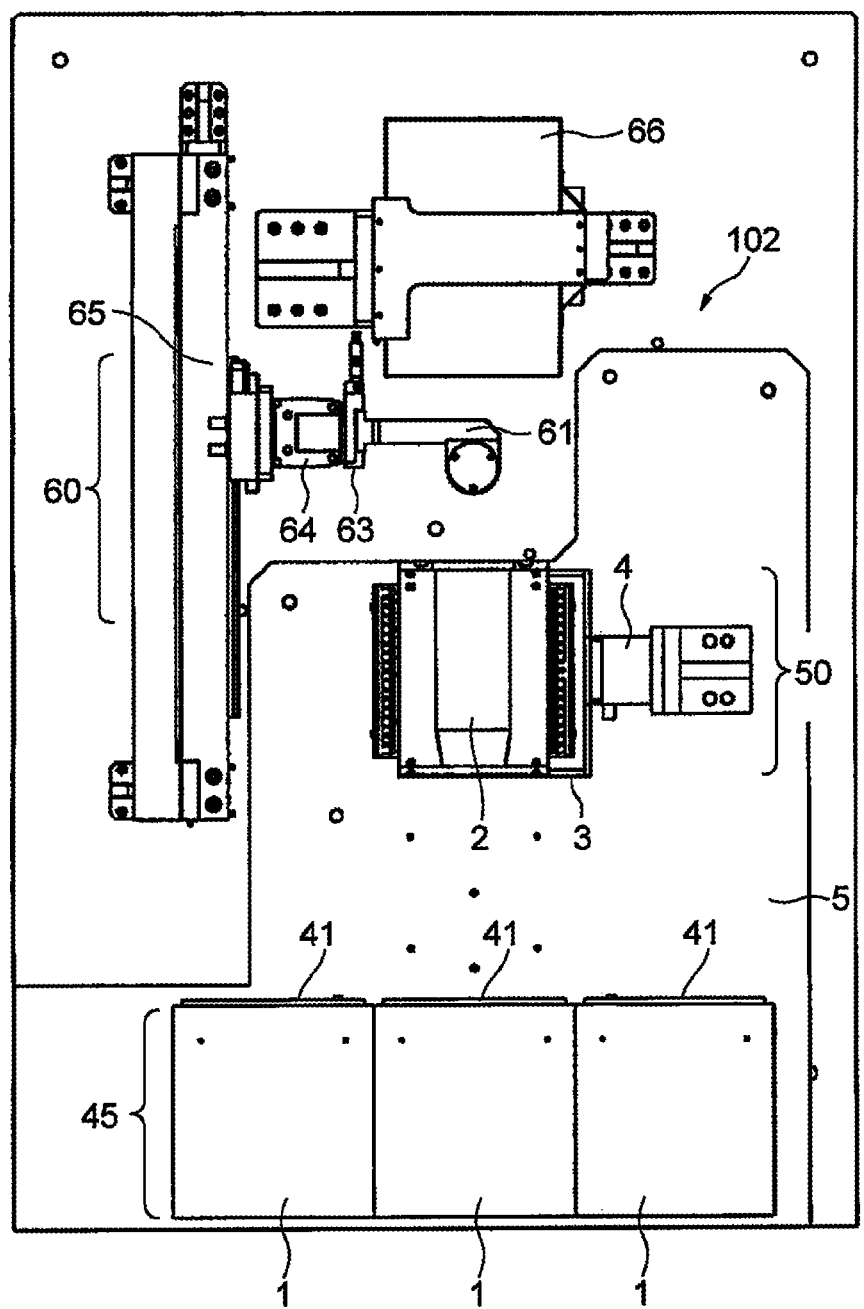
FIG. 9 is a plan view showing one exemplary embodiment of a tray developing mechanism for forming a gap in a predetermined size between each of the trays by developing each of the trays which configure the stacking type tray in the thickness direction.
Figure 10:
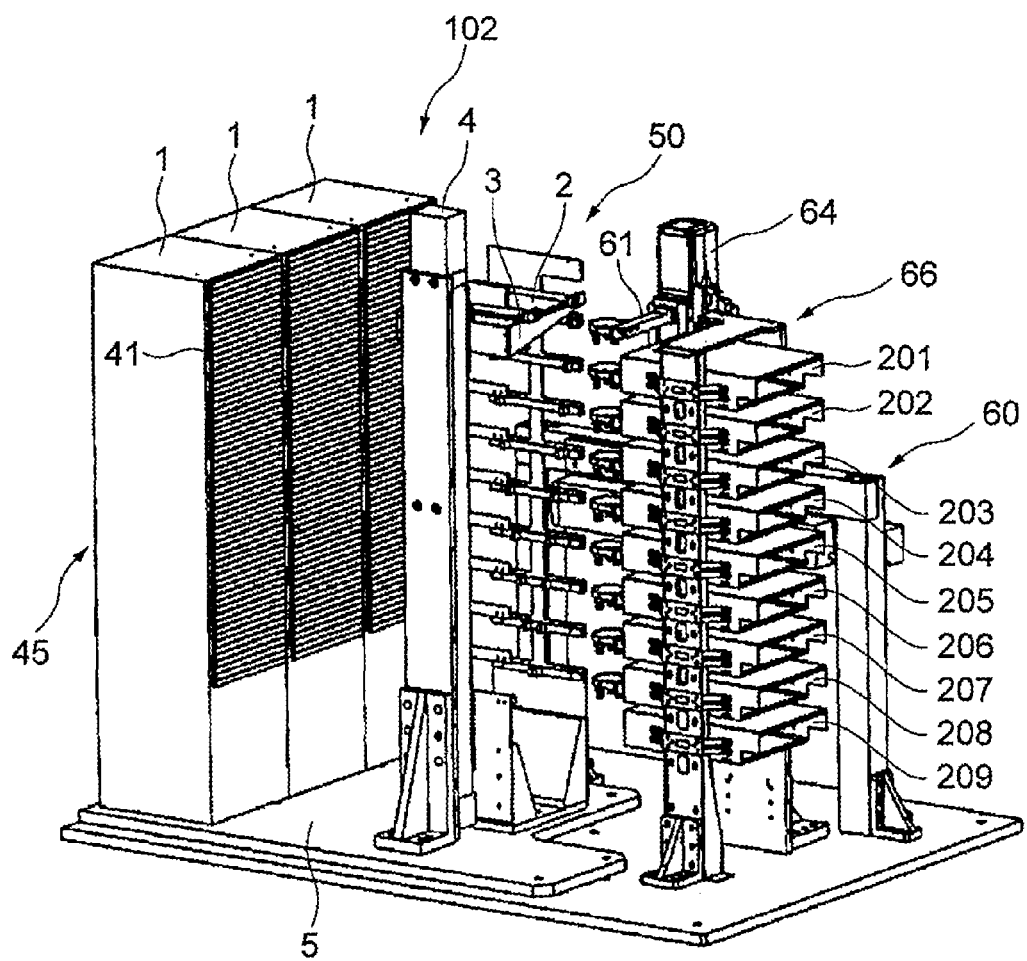
FIG. 10 is a perspective view of the structure of the tray developing mechanism.
Figure 11:
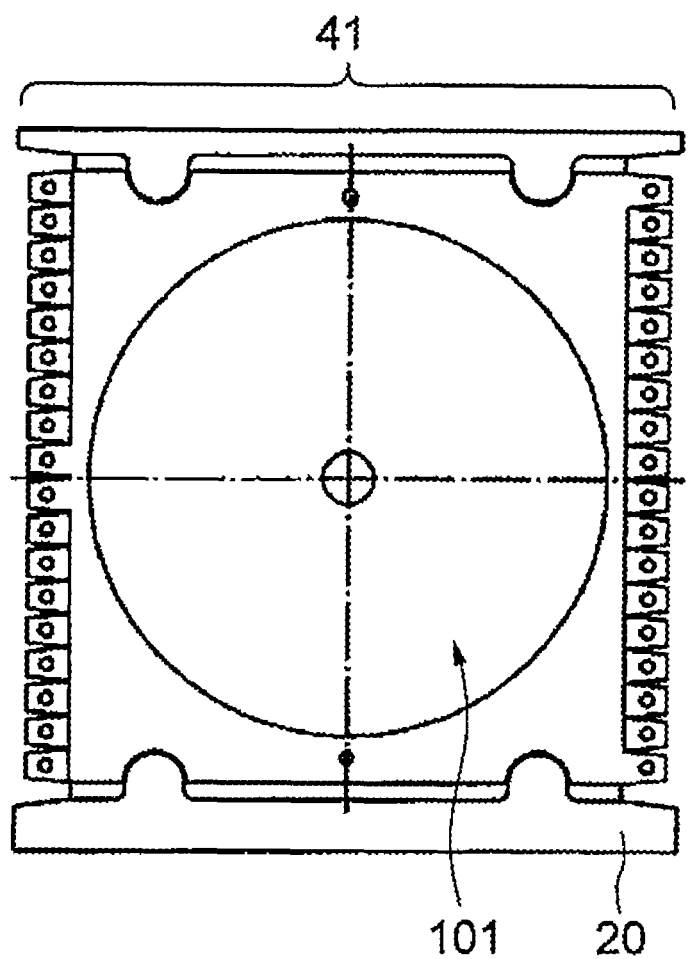
FIG. 11 is a plan view showing the structure of an optical disc transportation body which is formed by the stacking type tray housed on the tray base.
Figure 12:
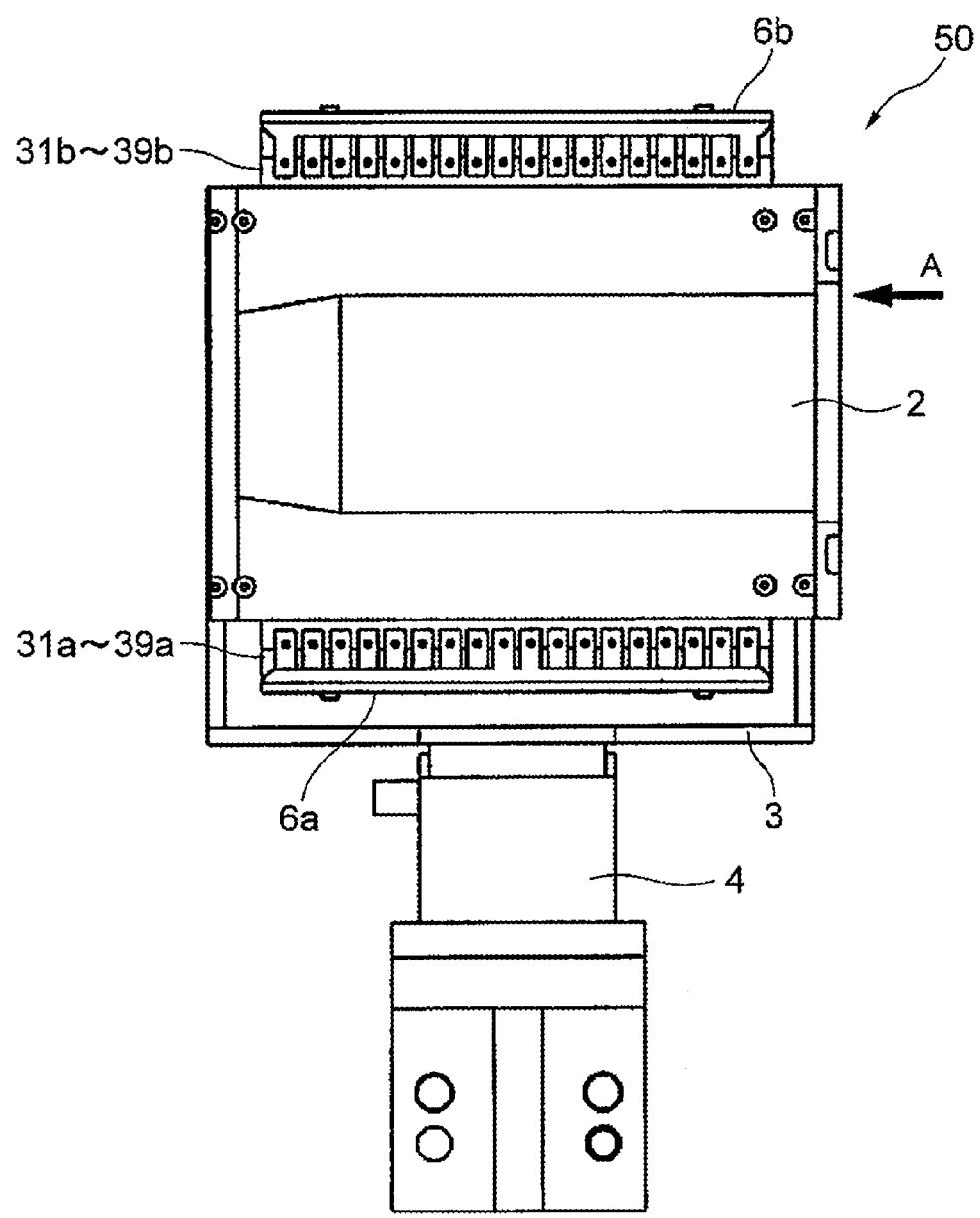
FIG. 12 is a fragmentary top plan view of a developing portion of the tray developing mechanism.
Figure 13:
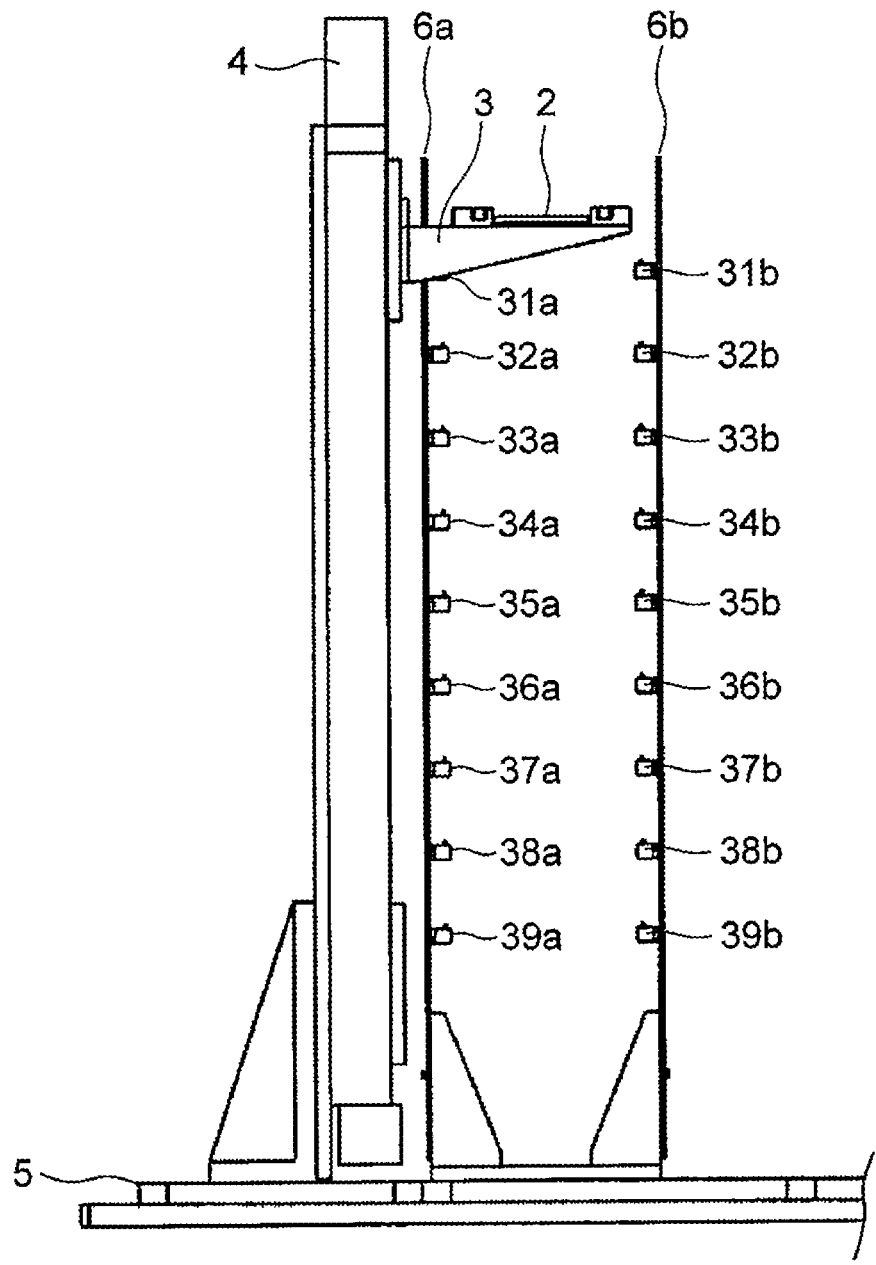
FIG. 13 is a side view of the developing portion of the tray developing mechanism taken along an arrow A.
Figure 14:
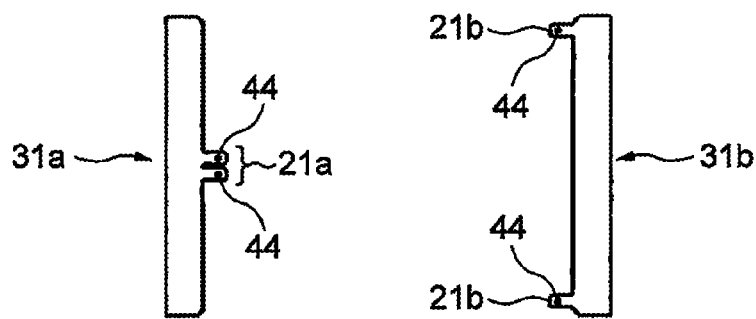
FIG. 14 show plan views of specific structures of some of the protrusion bases having supporting portions.
Figure 14:
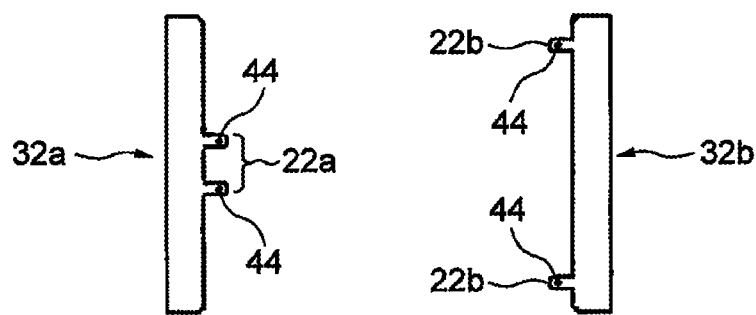
Figure 14:
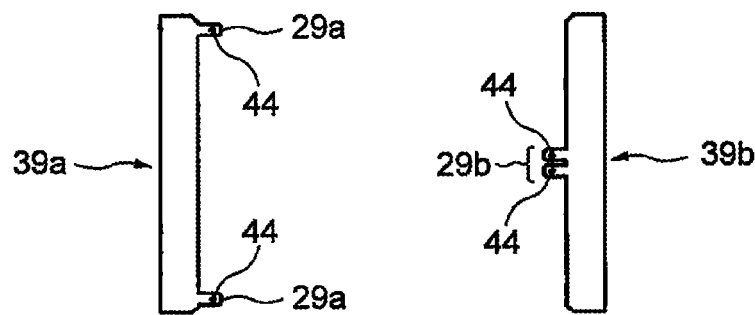
Figure 15:
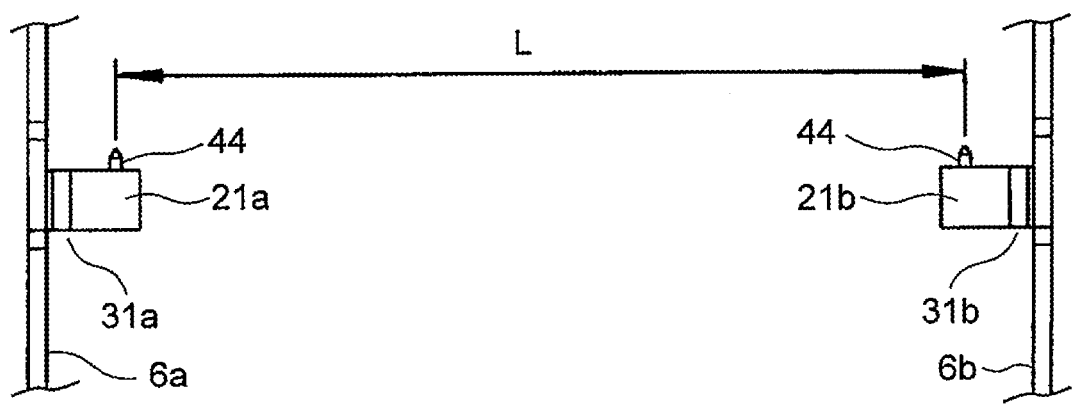
FIG. 15 is an illustration showing a corresponding relation of attaching positions of the protrusion bases in a pair.
Figure 16:
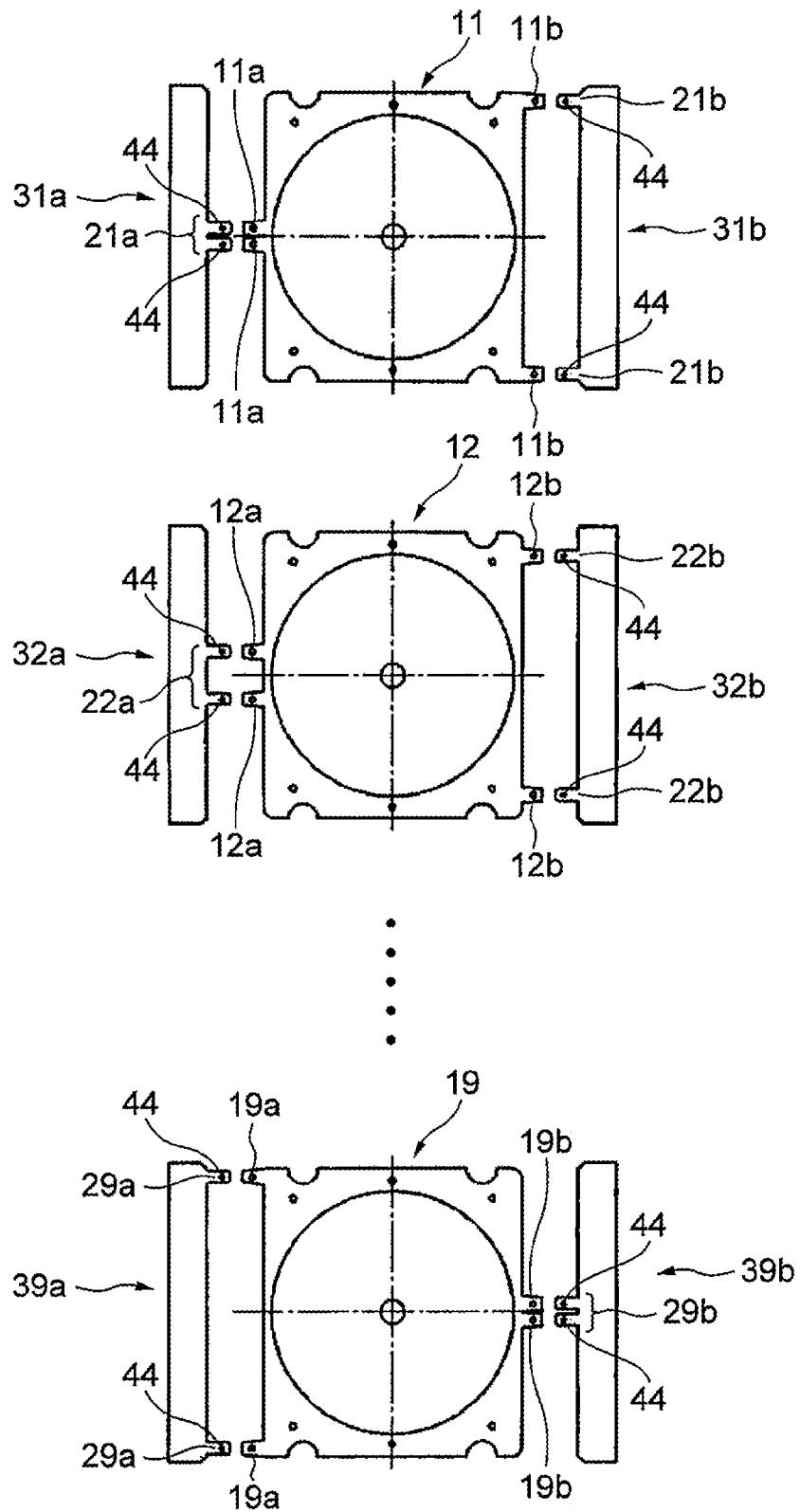
FIG. 16 shows reference charts showing corresponding relations between the protrusions of each tray and the supporting portions of a tray distributing/holding portion.
Figure 17:
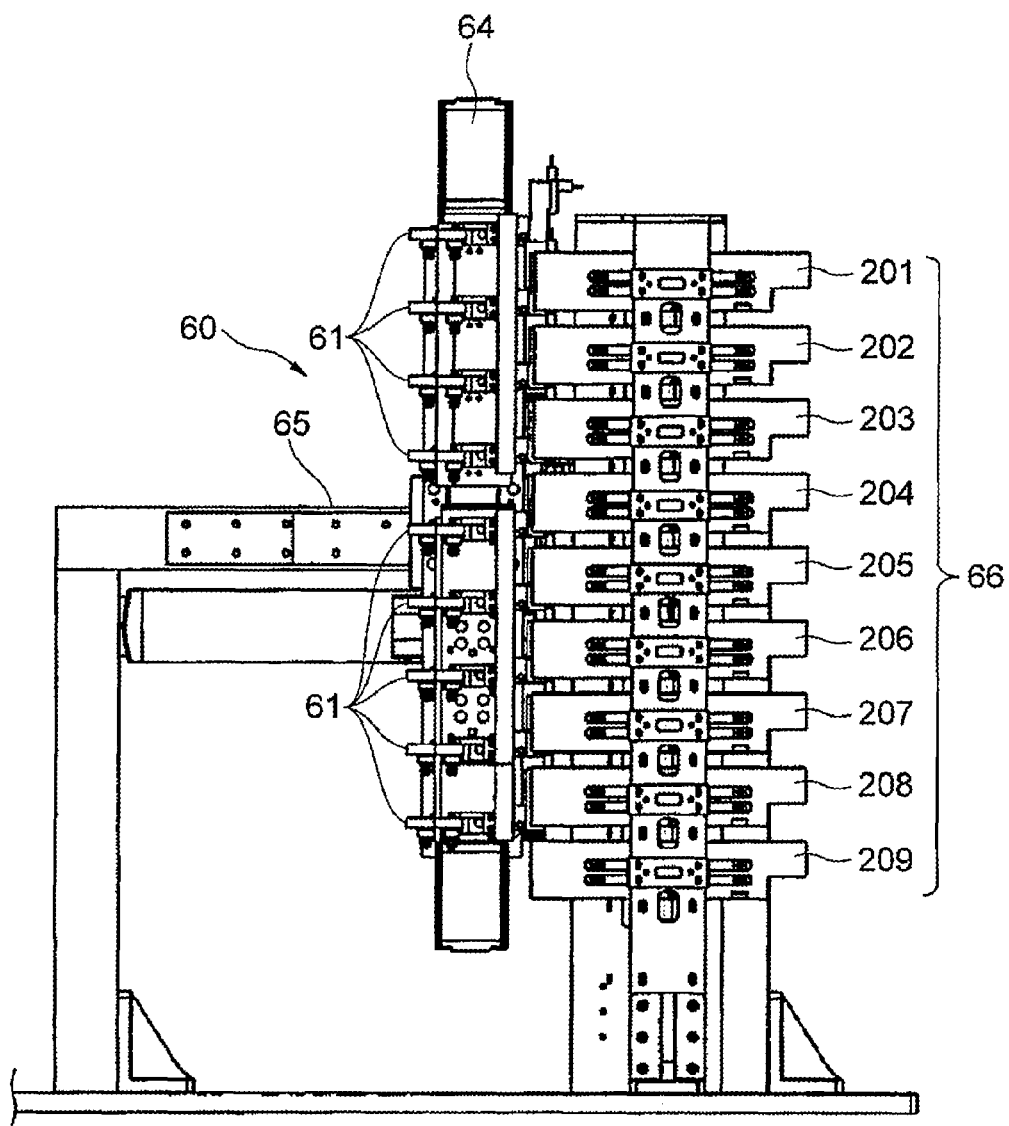
FIG. 17 is a side view of a transporting portion of the tray developing mechanism.
Figure 18:
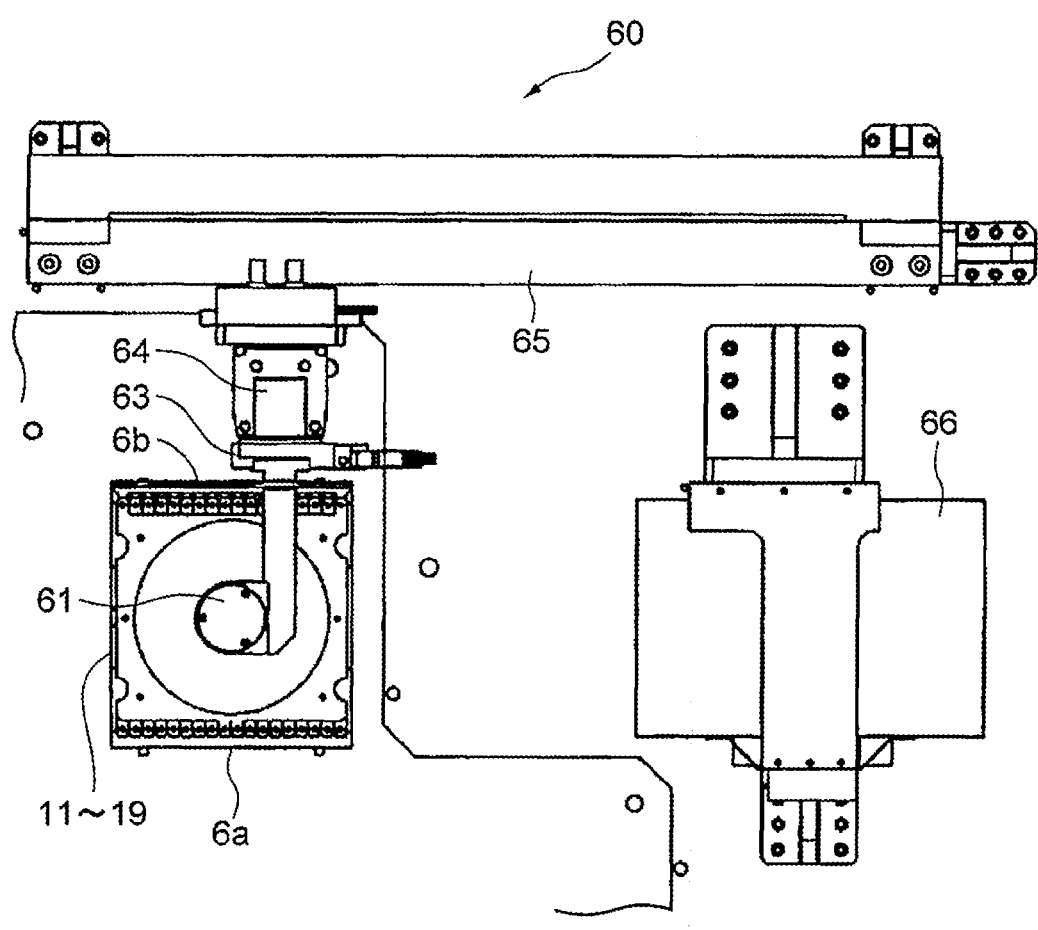
FIG. 18 is a plan view of the transporting portion of the tray developing mechanism.
Figure 19:
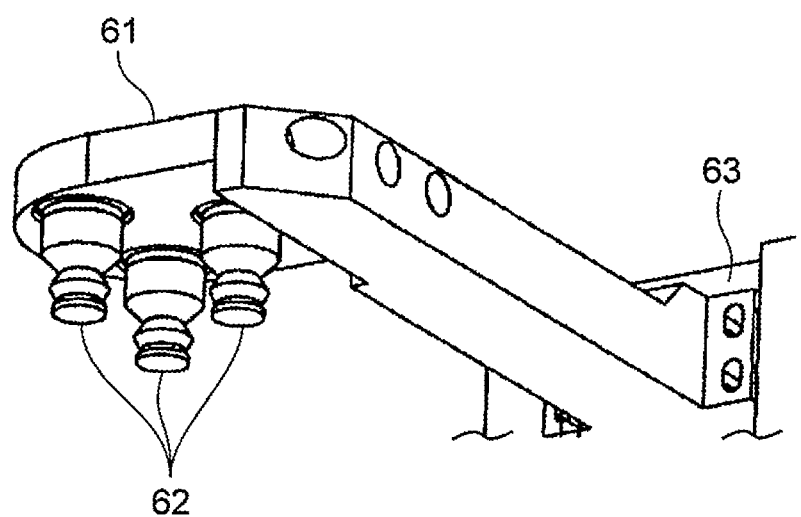
FIG. 19 is an enlarged perspective view showing an absorption arm provided to the transporting portion.
Figure 20:
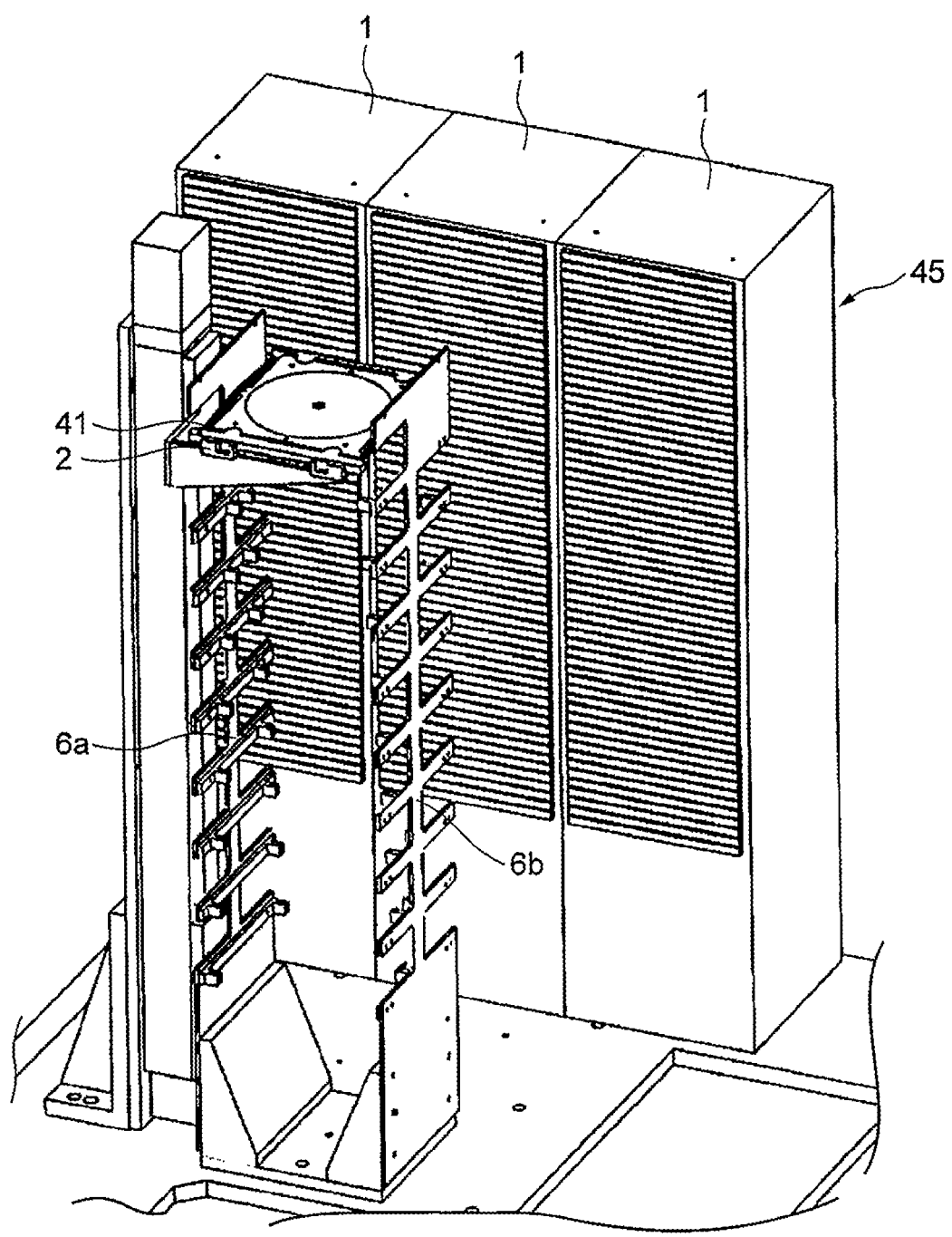
FIG. 20 is an explanatory diagram showing actions of the tray developing mechanism, which shows a state where the table is at a developing operation standby position.
Figure 21:
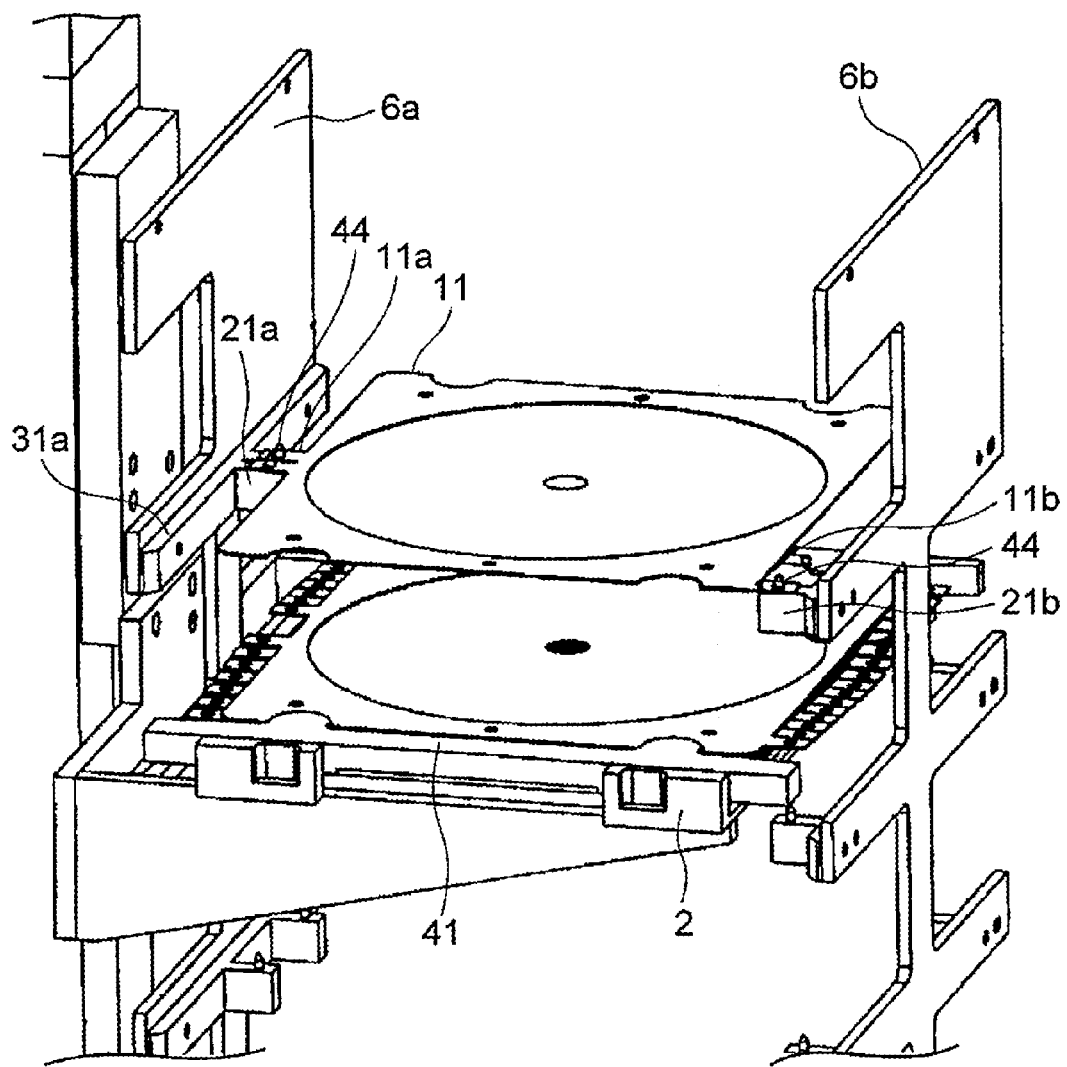
FIG. 21 is an explanatory diagram showing actions of the tray developing mechanism, which shows a state where the first tray is separated and held by a moving-down action of the table.
Figure 22:
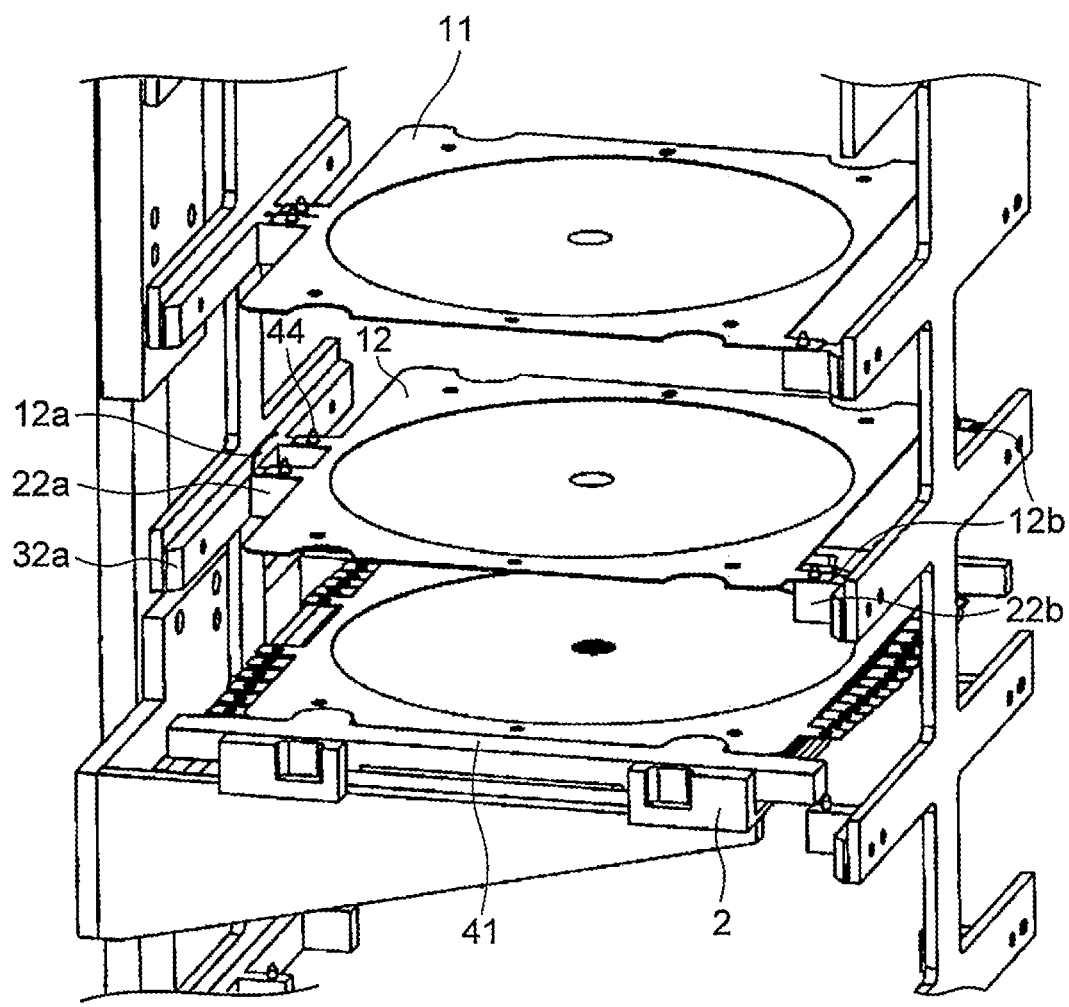
FIG. 22 is an explanatory diagram showing actions of the tray developing mechanism, which shows a state where the first tray and the second tray are separated and held by a moving-down action of the table.
Figure 23:
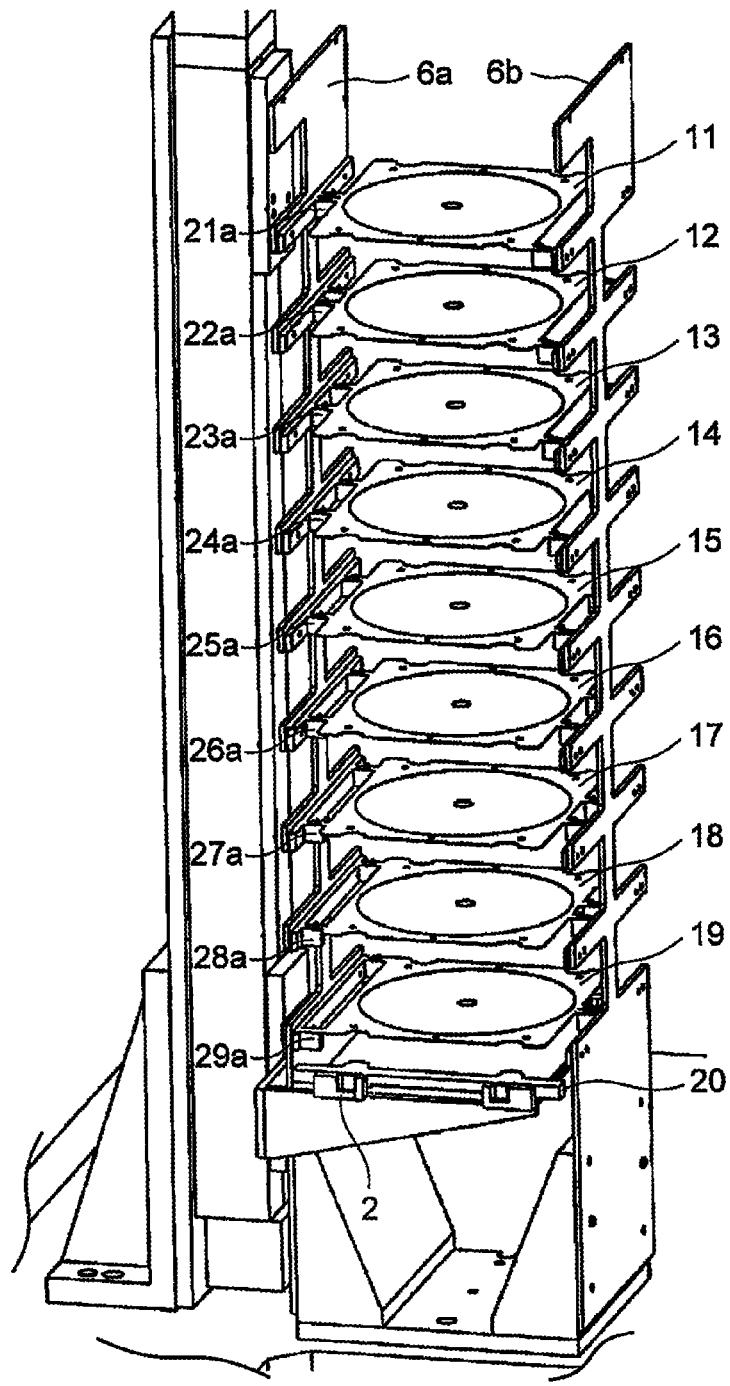
FIG. 23 is an explanatory diagram showing actions of the tray developing mechanism, which shows a state where all of the trays from the first tray to the ninth tray are separated and held by moving-down actions of the table.
Figure 24:
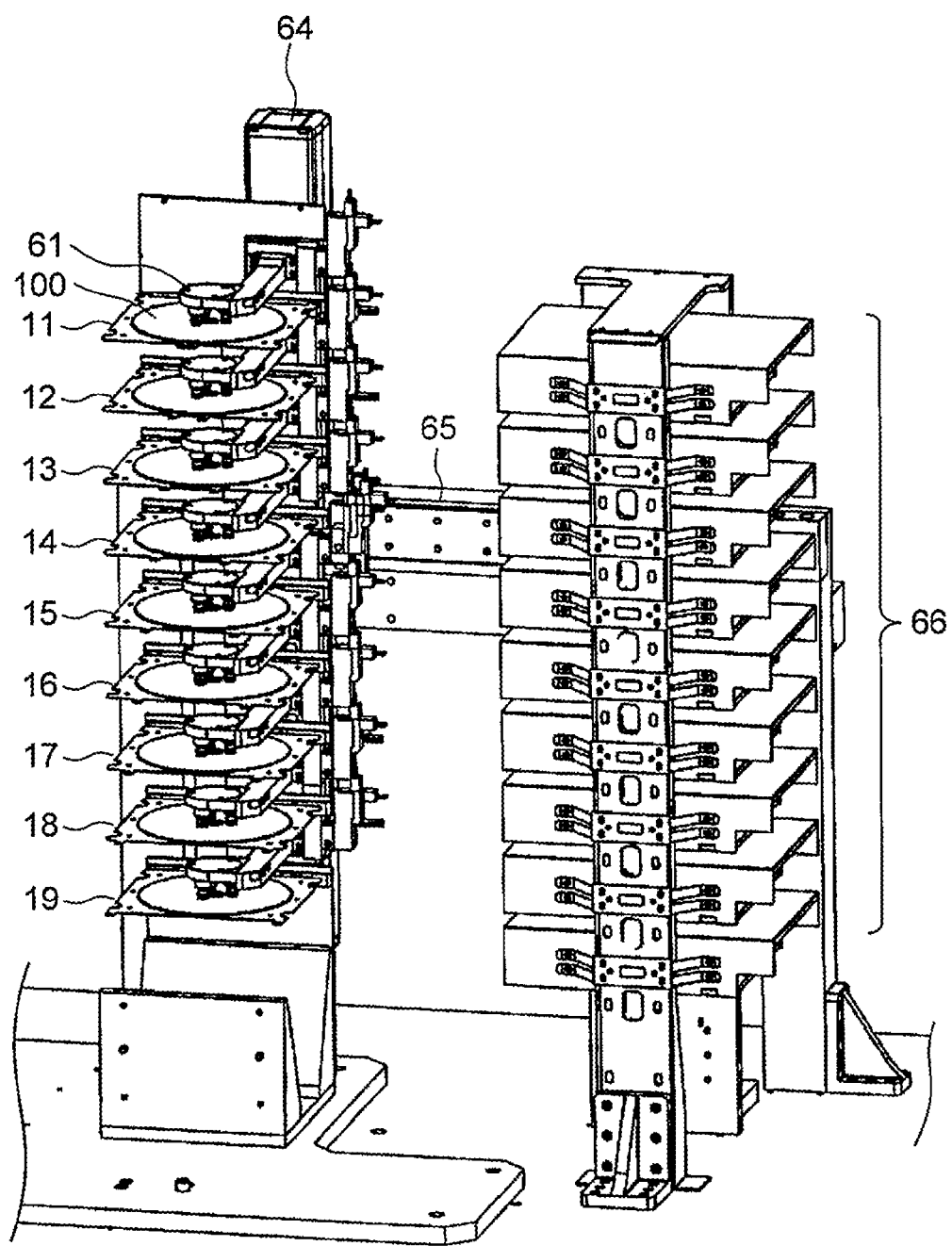
FIG. 24 is an explanatory diagram showing actions of the tray developing mechanism, which shows a state where the absorption pads are positioned at approach points slightly above the first tray to the ninth tray.
Figure 25:
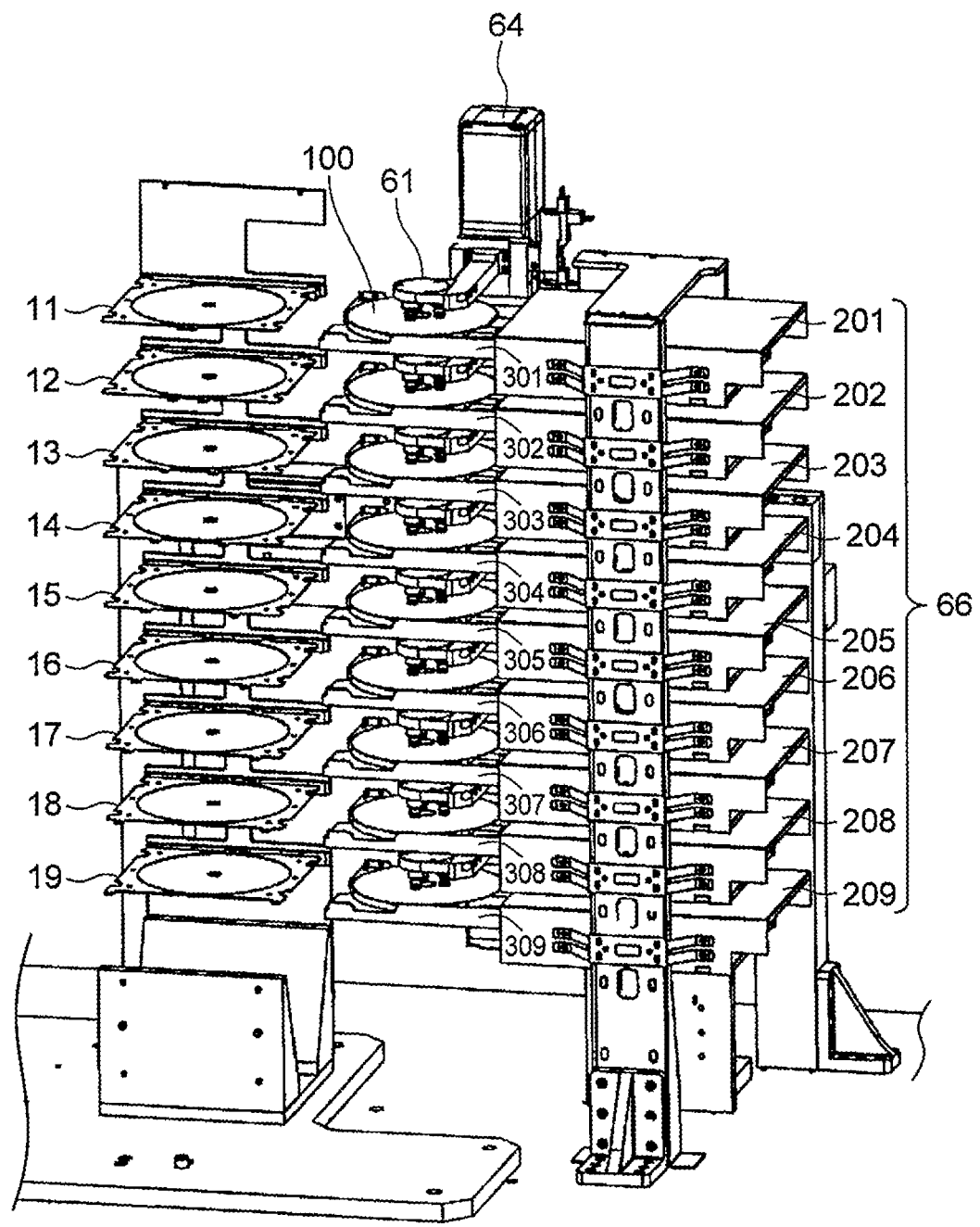
FIG. 25 is an explanatory diagram showing actions of the tray developing mechanism, which shows a state where the optical discs are loaded to drive-side trays of each of the recording/reproducing devices.
Figure 26:
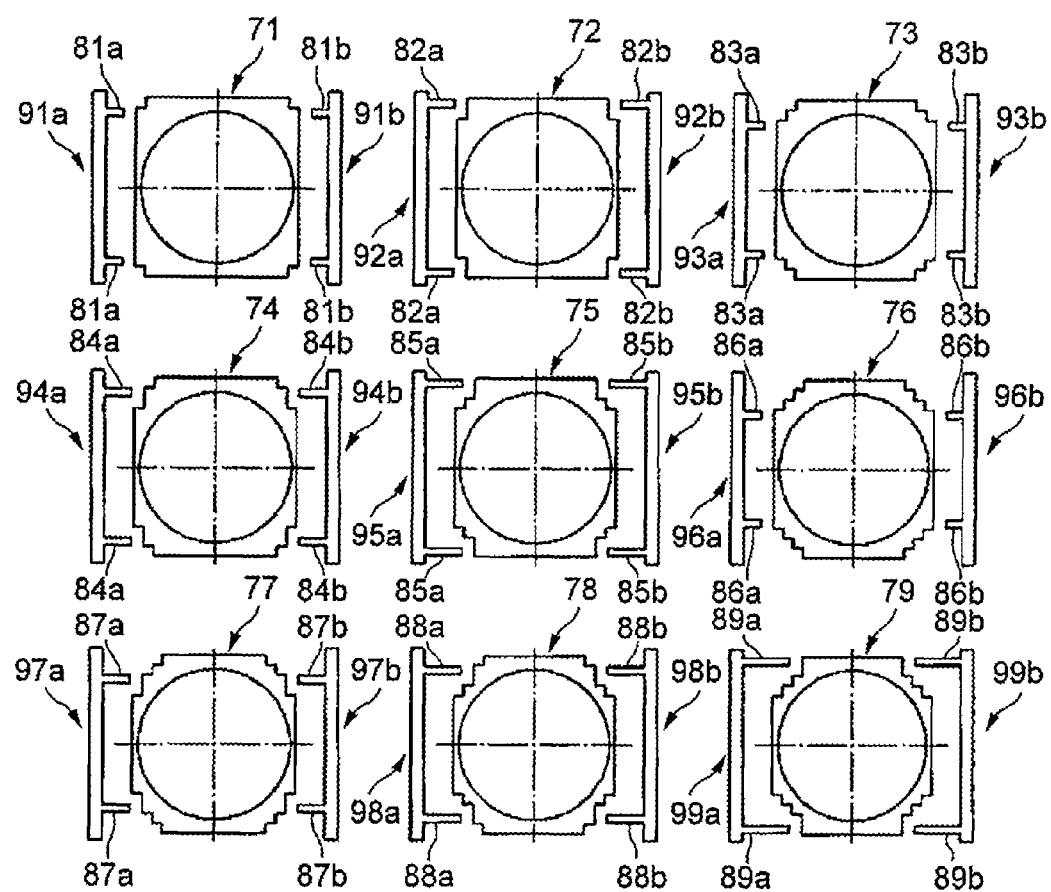
FIG. 26 is a plan view showing the shapes of the first tray to the ninth tray as well as shapes of protrusion bases and supporting portions corresponding to each tray according to another exemplary embodiment.
Figure 27:
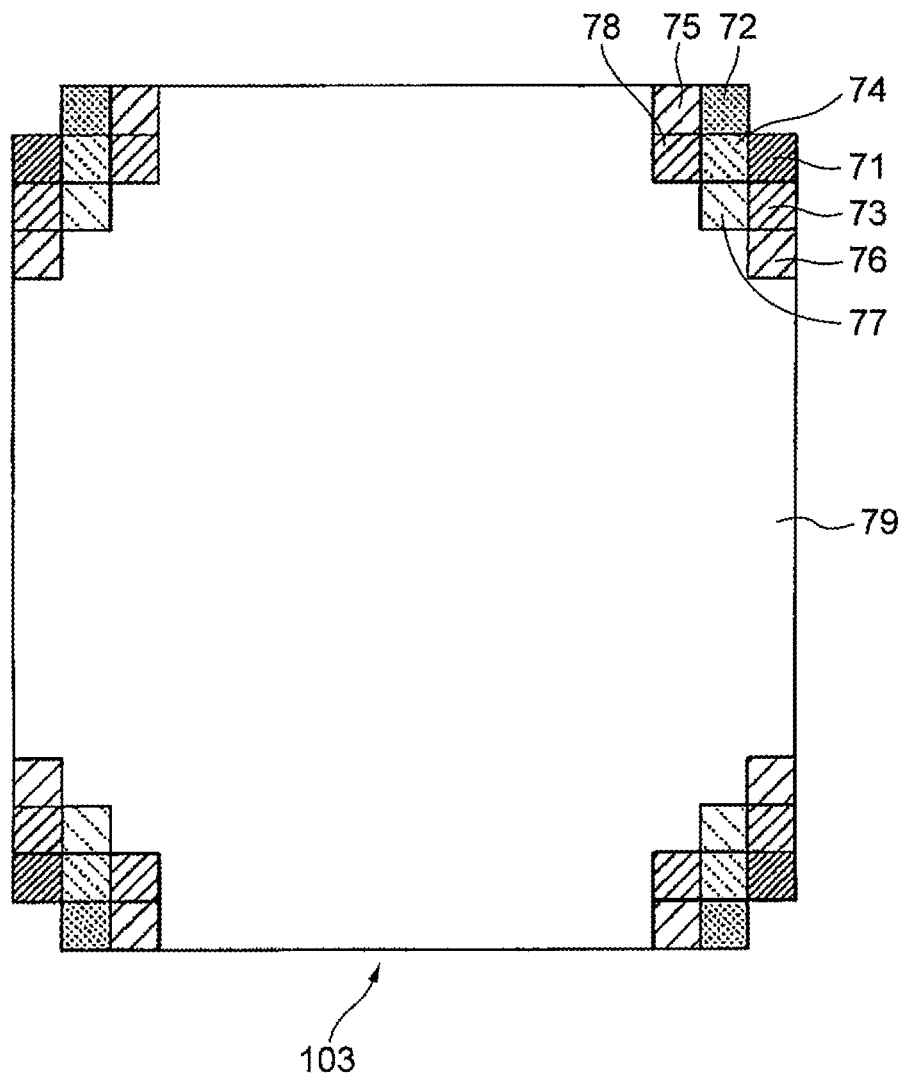
FIG. 27 is an illustration showing a bottom-side view of a stacking type tray formed by stacking the trays of the exemplary embodiment.
Figure 28:
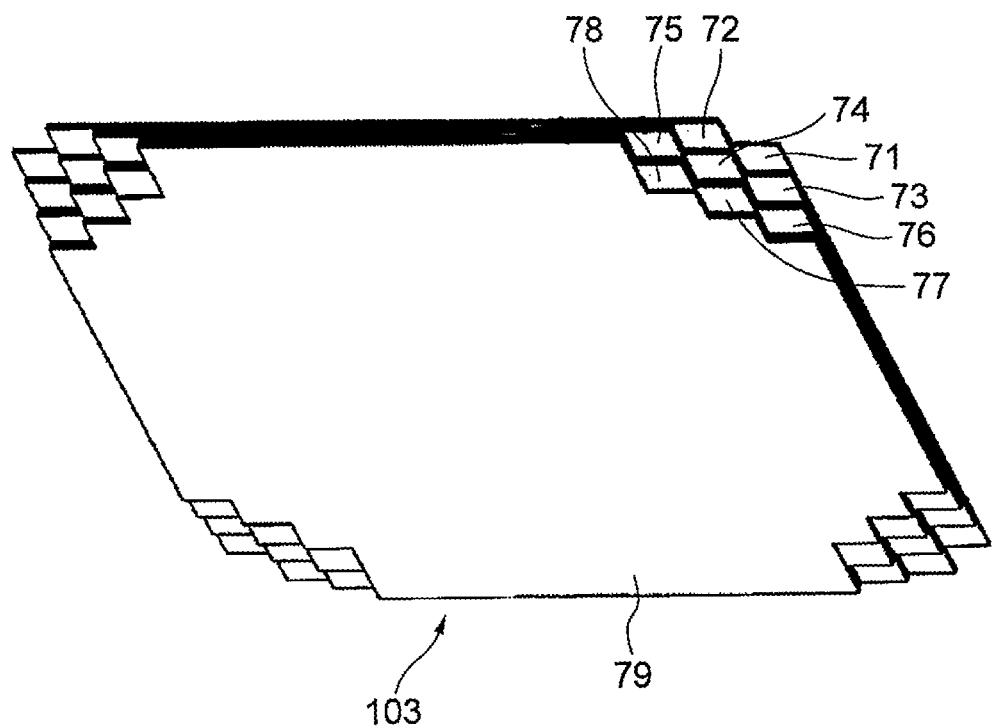
FIG. 28 is a perspective view of the stacking type tray taken obliquely from the bottom side.
Figure 29:
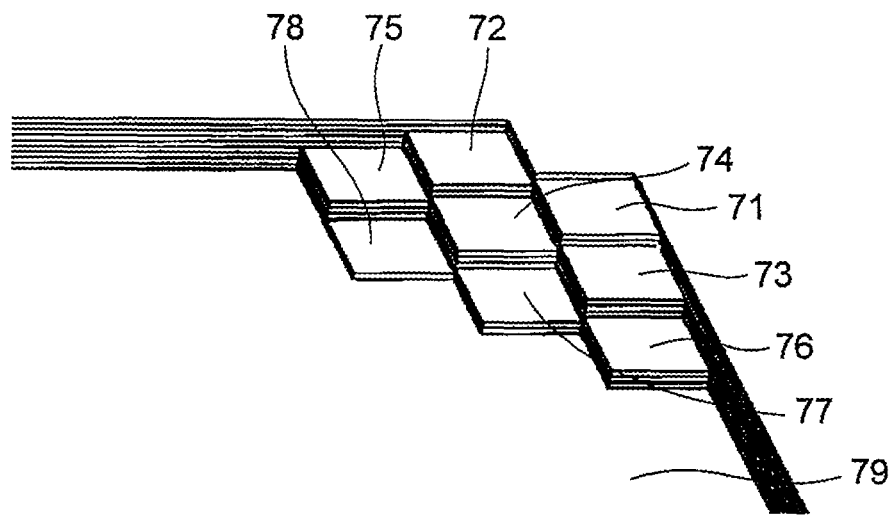
FIG. 29 is a fragmentary enlarged view of FIG. 28, which shows details of step-like notches formed on the first tray to the ninth tray of the exemplary embodiment.
Figure 30:
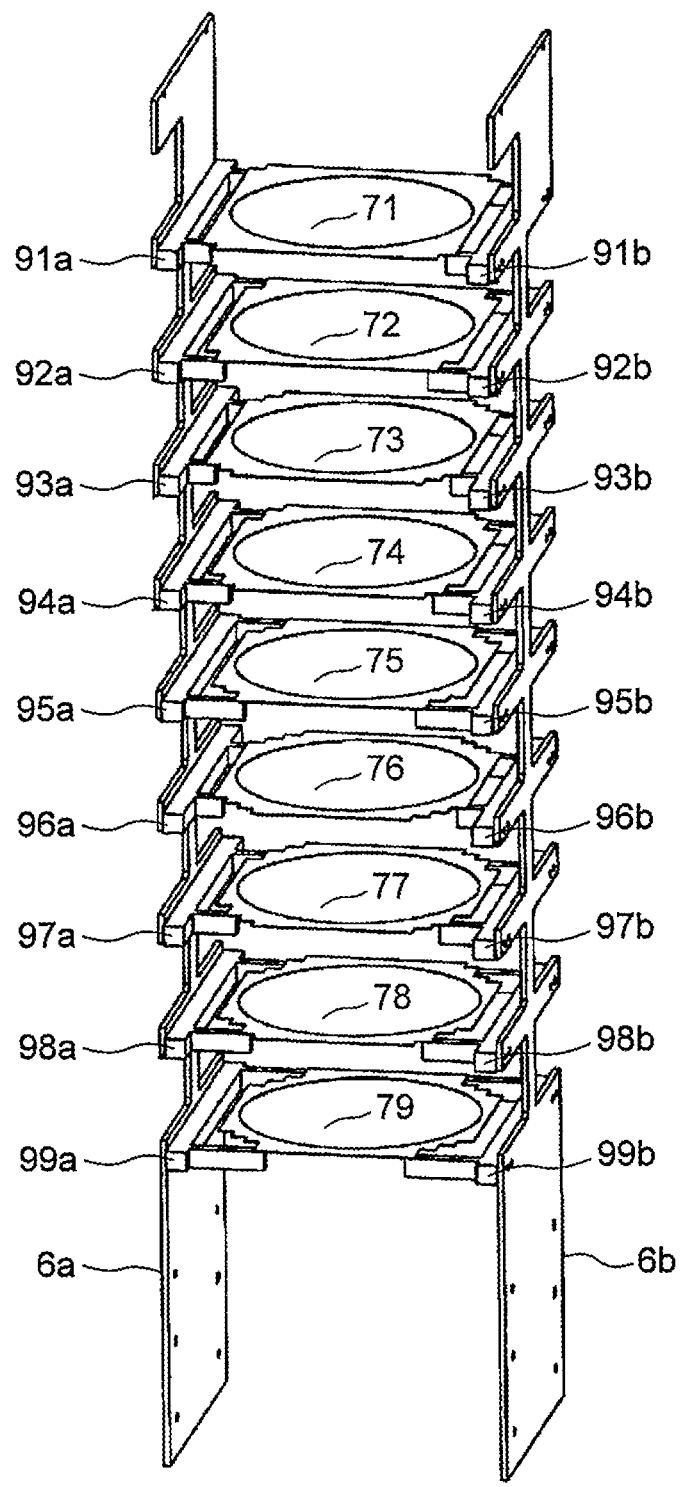
FIG. 30 is a perspective view showing a state of the first to the ninth tray 7 of the exemplary embodiment developed on the tray distributing/holding portion of the developing portion.
Figure 31:
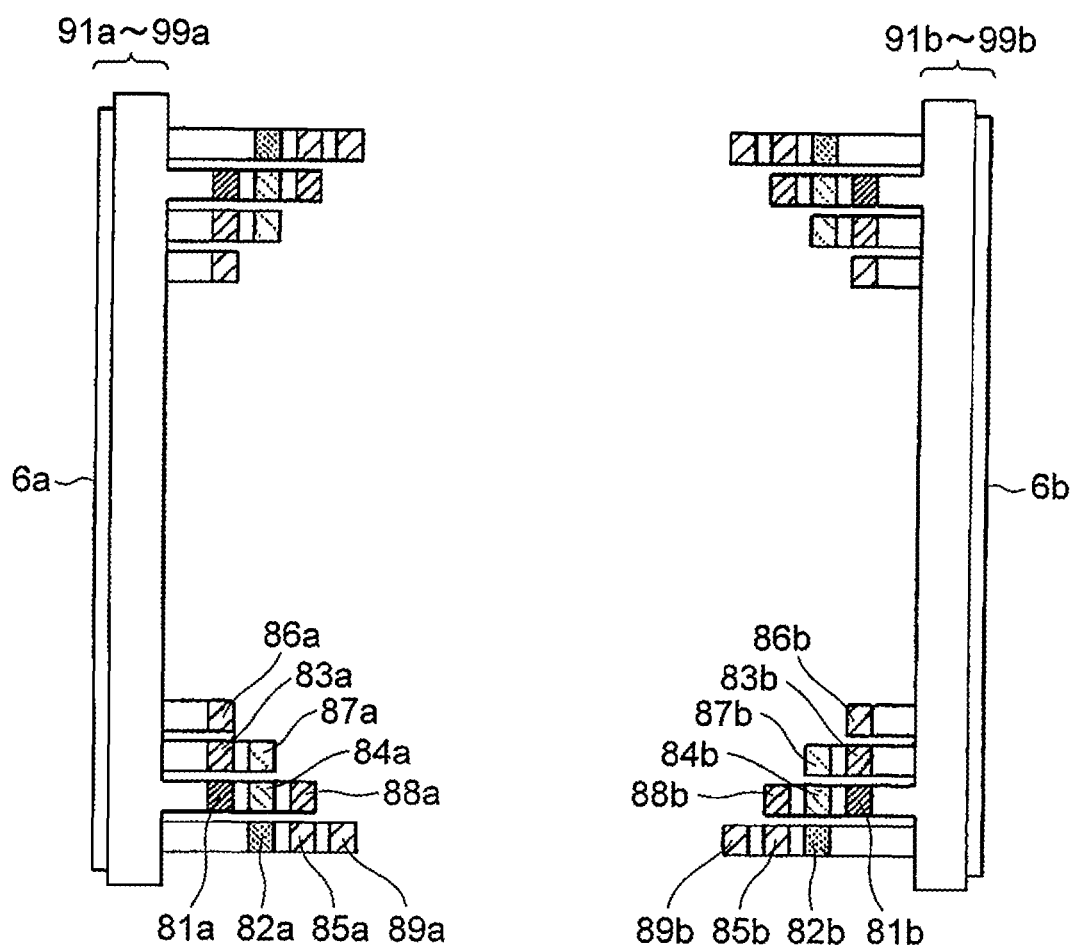
FIG. 31 is a top plan view of the tray distributing/holding portion of the exemplary embodiment.
Figure 32:
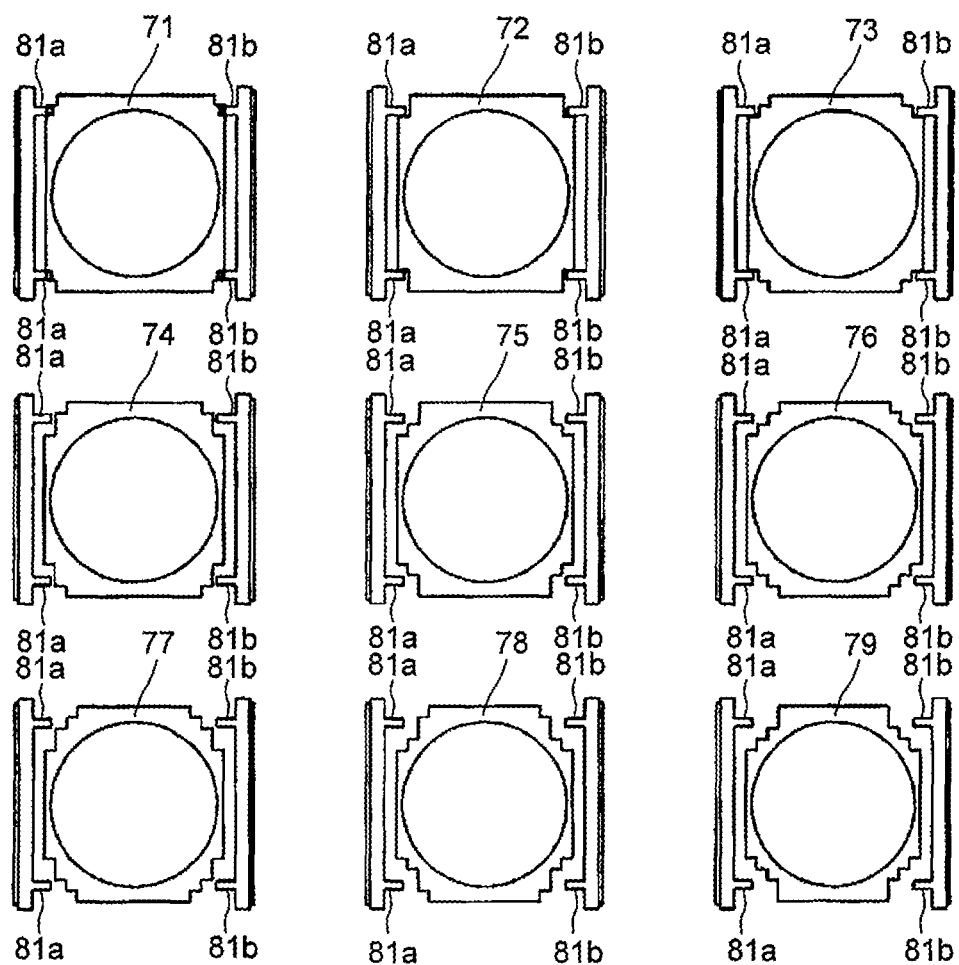
FIG. 32 is an explanatory illustration showing existence of interferences in the first tray to the ninth tray by taking the supporting portions located on the uppermost part of the tray distributing/holding portion as the reference.
Figure 33:
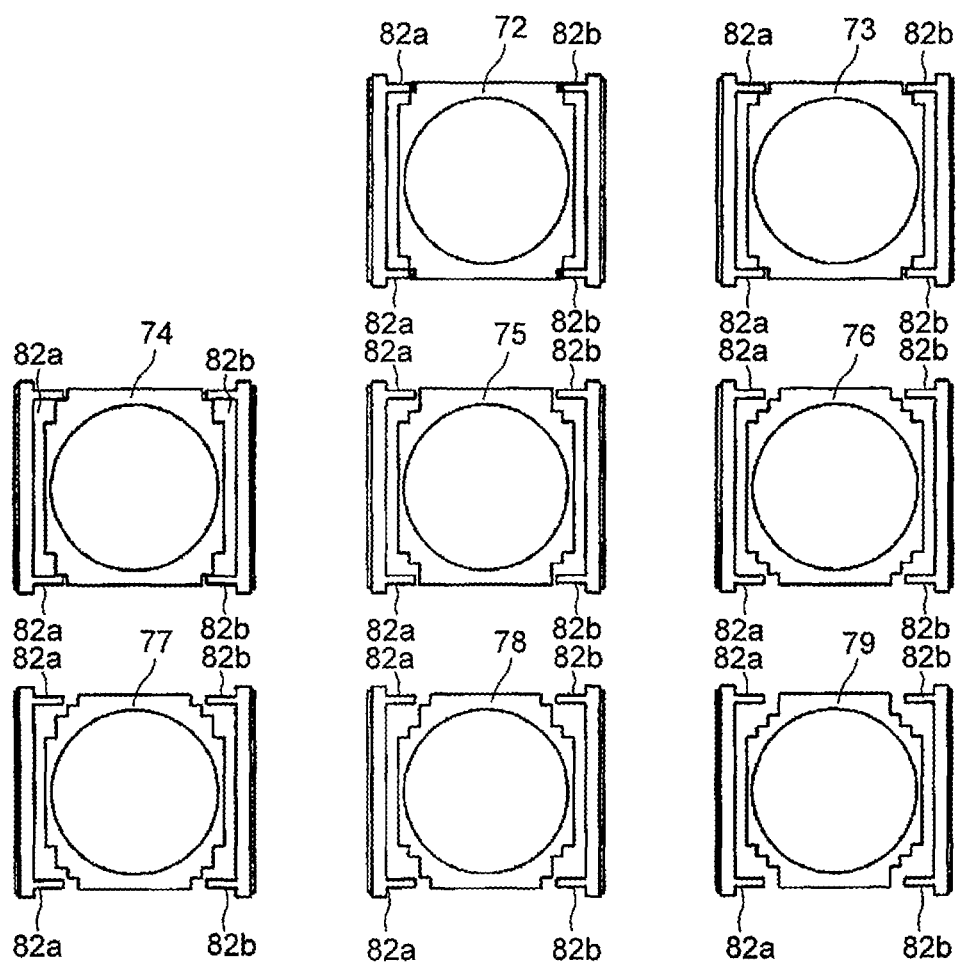
FIG. 33 is an explanatory illustration showing existence of interferences in the second tray to the ninth tray by taking the supporting portions located on the second uppermost part of the tray distributing/holding portion as the reference.
Figure 34:
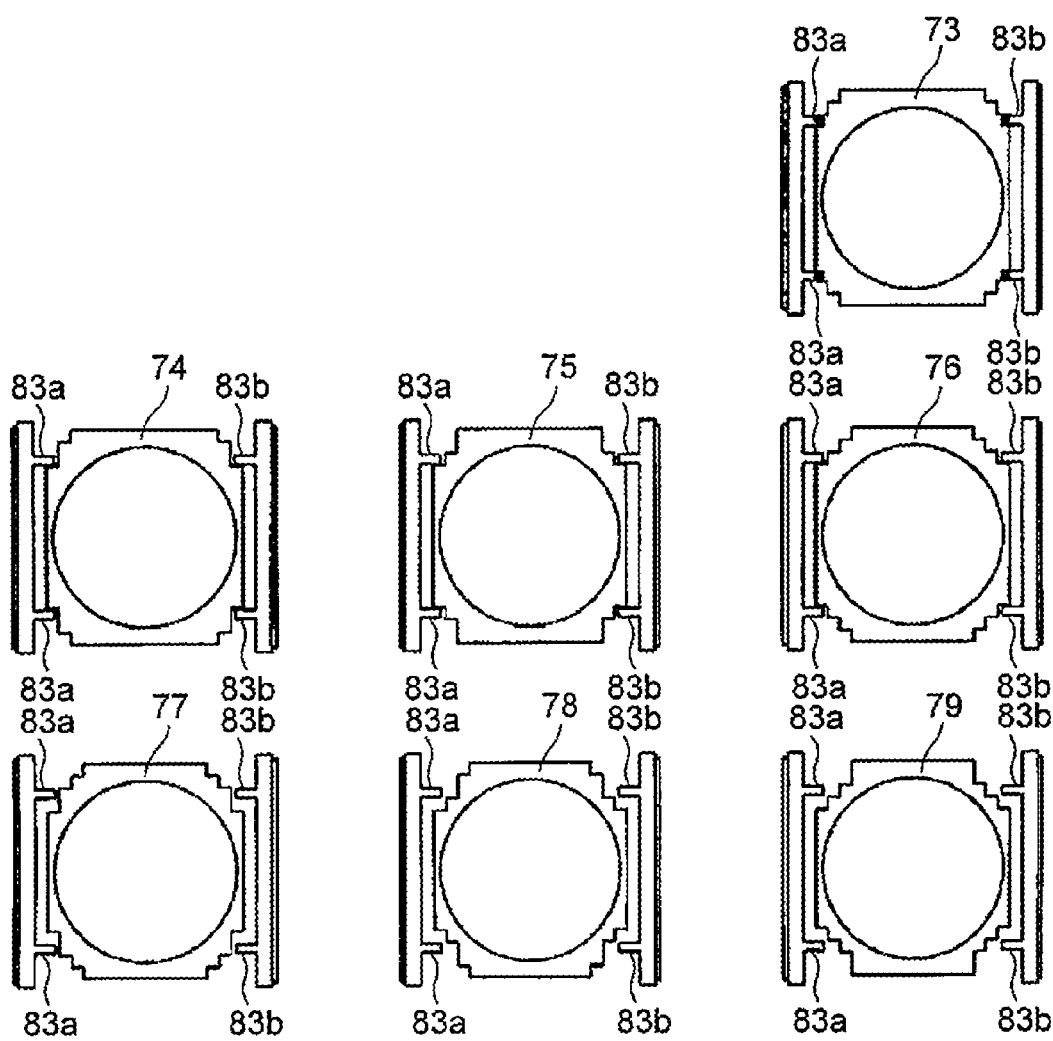
FIG. 34 is an explanatory illustration showing existence of interferences in the third tray to the ninth tray by taking the supporting portions located on the third uppermost part of the tray distributing/holding portion as the reference.

1 Stocker
2 Table (tray distributing up/down table)
3 Bracket
4 Vertical actuator
5 Base plate
6a, 6b Frame (tray distributing/holding portion)
11 First tray
11a, 11b Protrusion (tray operation portion)
12 Second tray
12a, 12b Protrusion (tray operation portion)
13 Third tray
13a, 13b Protrusion (tray operation portion)
14 Fourth tray
14a, 14b Protrusion (tray operation portion)
15 Fifth tray
15a, 15b Protrusion (tray operation portion)
16 Sixth tray
16a, 16b Protrusion (tray operation portion)
17 Seventh tray
17a, 17b Protrusion (tray operation portion)
18 Eighth tray
18a, 18b Protrusion (tray operation portion)
19 Ninth tray
19a, 19b Protrusion (tray operation portion)
20 Tray base
21a-29a, 21b-29b Supporting portion
31a-39a, 31b-39b Protrusion base
40 Recessed part
41 Optical disc transportation body
42 Through hole
43 Tray loading portion
44 Positioning pin
45 Housing portion
50 Developing portion
60 Transporting portion
61 Absorption arm
62 Absorption pad
63 Connector metal fitting
64 Vertical actuator
65 Horizontal actuator
66 Recording/reproducing portion
71 First tray
72 Second tray
73 Third tray
74 Fourth tray
75 Fifth tray
76 Sixth tray
77 Seventh tray
78 Eighth tray
79 Ninth tray
81a-89a, 81b-89b Supporting portion
91a-99a, 91b-99b Protrusion base
100 Optical disc (disc-type storage medium)
101 Stacking type tray
102 Tray developing mechanism
103 Stacking type tray
201-209 Recording/reproducing device
301-309 Drive-side tray
δ Small gap

What is claimed is:

1. A stacking type tray formed by stacking trays for loading disc-type recording media in thickness direction, comprising tray operation portions provided at least at three points in a circumferential section of each of the trays, which do not overlap with any other trays in the thickness direction in a state where all the trays are being stacked, wherein:
each of the trays is formed in a substantially rectangular shape; a protrusion which forms the tray operation portion is provided at least one point on each of opposing two sides and at least three points in total on the two opposing sides; positions of each of the protrusions are shifted along directions of each side for each of the trays; and centroid of each of the trays is located inside a virtual plane of each of the trays formed by having each of the protrusions as vertexes.

2. The stacking type tray as claimed in claim 1, wherein:
the protrusion is provided at two points each on the two opposing sides; isolated distance between each of the protrusions on one of the two opposing sides increases in order according to stacking order of the trays; isolated distance between each of the protrusions on other side of the two opposing sides decreases in order according to the stacking order of the trays; and sum of the isolated distances between the protrusions of each side becomes substantially same as length of one of the sides.

3. The stacking type tray as claimed in claim 2, wherein:
the protrusion is provided at two points in a center part of the one side of the two opposing sides of the tray located on an uppermost layer; and the protrusion is provided at two points on both ends of the other side of the two opposing sides of the tray located on the uppermost layer.

4. A stacking type tray formed by stacking trays for loading disc-type recording media in thickness direction, comprising tray operation portions provided at least at three points in a circumferential section of each of the trays, which do not overlap with any other trays in the thickness direction in a state where all the trays are being stacked, wherein:
each of the trays is formed in a substantially rectangular shape; and the tray operation portion is formed by providing a step-like notch in four corners of the tray.

* * * * *